(12) United States Patent
Matsakis et al.

(10) Patent No.: US 12,461,905 B1
(45) Date of Patent: Nov. 4, 2025

(54) MULTI-DIMENSIONAL CONTEXT BASED CONFIGURATION SYSTEM

(71) Applicant: Amazon Technologies, Inc., Seattle, WA (US)

(72) Inventors: Nicholas Matsakis, Redwood City, CA (US); Lily Violet Barrowman, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/620,878

(22) Filed: Mar. 28, 2024

(51) Int. Cl.
*G06F 7/00* (2006.01)
*G06F 16/23* (2019.01)
*H04L 41/0873* (2022.01)

(52) U.S. Cl.
CPC ...... *G06F 16/2365* (2019.01); *H04L 41/0873* (2013.01)

(58) Field of Classification Search
CPC .................. G06F 16/2365; H04L 41/0873

USPC ................................................. 707/600–899
See application file for complete search history.

(56) References Cited

U.S. PATENT DOCUMENTS

2015/0278285 A1* 10/2015 Meng ............... G06F 16/24578
707/690

* cited by examiner

*Primary Examiner* — Isaac M Woo
(74) *Attorney, Agent, or Firm* — Knobbe, Martens, Olson & Bear, LLP

(57) ABSTRACT

The present disclosure relate to systems and methods for providing input data analysis configuration for a plurality of network-based services. A configuration service may obtain operator-defined inputs that define the value or variable of each attribute of the configuration service. The configuration service can generate one or more input data analysis configurations based on the operator-defined value or variable for each of the attributes. The configuration service can validate each of the one or more input data analysis configurations by compiling the configuration. For example, the configuration service can perform a conflict check to determine any conflicted values between attributes. The configuration service can also perform a completeness check to determine any undefined attributes.

13 Claims, 9 Drawing Sheets

MULTI-DIMENSIONAL CONTEXT BASED CONFIGURATION SYSTEM

BACKGROUND

Generally described, external computing devices and communication networks can be utilized to exchange data and/or information. In a common application, an external computing device can request content from another external computing device via the communication network. For example, a customer having access to an external computing device can utilize a software application to request content or access network-hosted applications/functionality from an external computing device via the network (e.g., the Internet). Additionally, the external computing device can collect or generate information and provide the collected information to a network-based customer computing device for further processing or analysis. The external computing device can be referred to as a customer computing device.

In some embodiments, a network service provider can provide various types of network-based services that can execute tasks based on inputs from the customer computing device. In some scenarios, a set of network-based services can be configured to receive input data from their customers and analyze the received input data to provide services as requested by their customers. For example, network-based services can be configured to provide a database that can be searched based on the input data provided by a customer. In this example, the network-based services can receive input data from their customer and analyze the input data to generate output (e.g., search results from the database) that matches the analyzed results of the input data. For example, the network service provider can utilize an interface, such as a date search interface, to receive the input data as the customer inputs (e.g., customer's query) and provide its output corresponding to the input data by analyzing the input data and searching data based on the analysis results. The database can be any data store that can include an indexed data store.

In some embodiments, the network service provider can configure input data analysis configurations (e.g., input data analysis pattern) for analyzing the input data provided by customers to better suit specific applications. For instance, a service for analyzing the input data (e.g., customer input data) could be employed across various network-based services, with its analysis attributes configured for each service to optimize the customer input analysis configuration. In such cases, the analysis configuration of the input data can be modified according to its use in these network-based services. Illustratively, an operator of the network-based services-such as an organization providing the network-based services to its customers—can modify how the input data is analyzed.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1A:
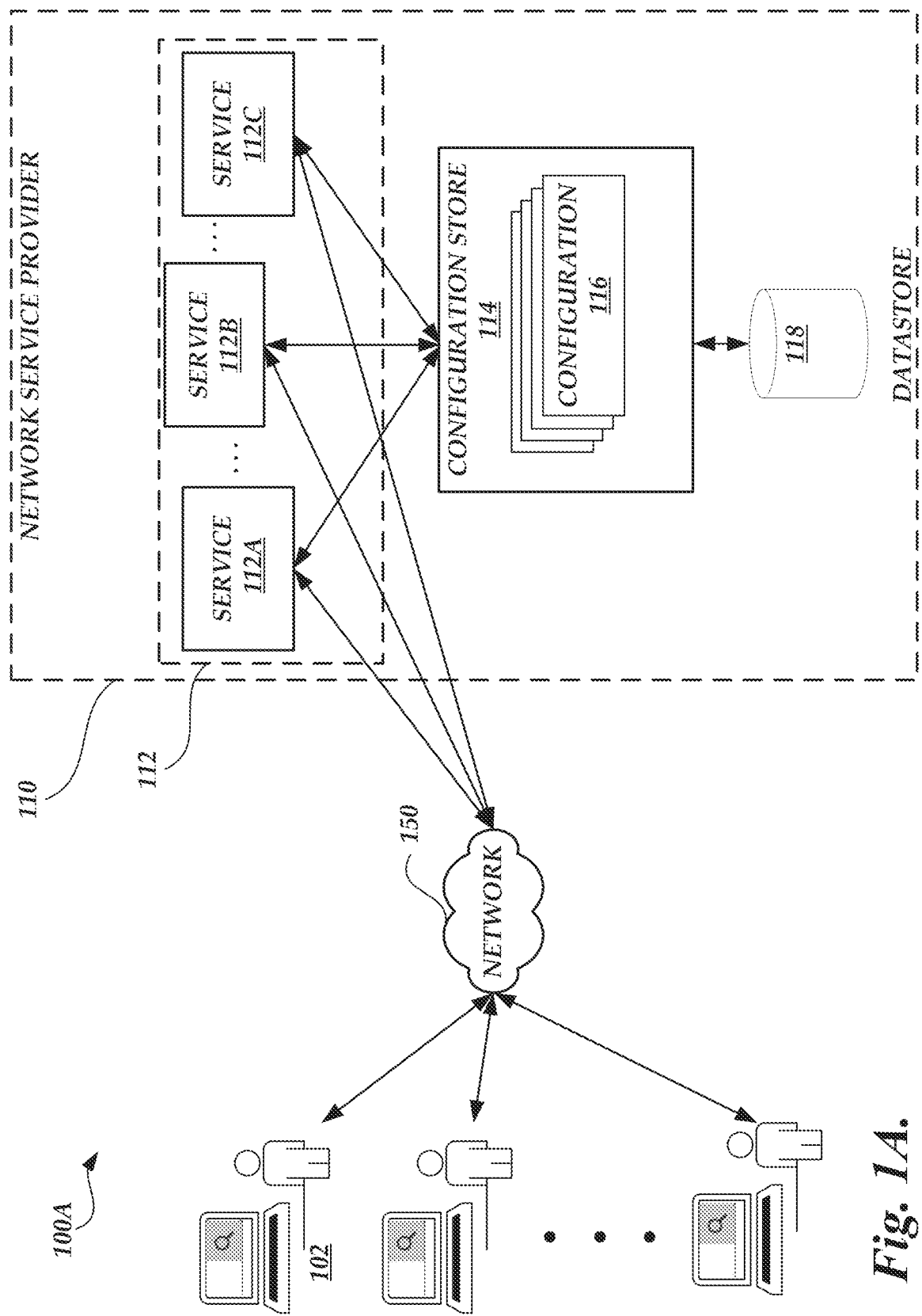
FIG. 1A depicts a block diagram of a network system that includes one or more customer computing devices, a network, and a network service provider, according to one or more embodiments.

Aspects of the present disclosure relate to systems and methods for providing input data processing pattern configurations (e.g., input data analysis configurations) provided by a network-based service (e.g., network service). Illustratively, one or more aspects of the present application correspond to an input data analysis configuration service (hereinafter "configuration service") and methodologies to generate and provide optimized configurations to be implemented in various types of the network-based services. The input data, as described herein, generally refers to any data provided by customers for using network-based services. For example, the input data can include input queries that customers provide to the network-based services, such as product descriptions for using a network-based service. The input data can include implicit context, such as customer's locale or computing device operating system, or explicit preferences, such as language preferences, and the like. The present disclosure does not limit the types of input data, and these types can be determined based on specific applications.

In some embodiments, an operator, such as network-based service developer(s), service administrator (s), service provider, and the like, can configure an analysis pattern of the input data received from the customers (e.g., customers using the network-bases services). For example, the present disclosure provides a configuration service that can configure the analysis pattern of the input data. Such configuration service may be implemented in a manner that incorporates various operator's inputs as operator-defined attributes utilized for the configuration service. The operator-defined attributes ("attributes"), as disclosed herein, can refer to operator-defined values and/or variables for each attribute utilized for the configuration service. The configuration service, as disclosed herein, can include attributes such as dimension(s), slice(s), record schema(s), configuration(s), type(s), scope(s), and the like, and in some embodiments, these attributes can be provided as a set of data structures.

In some aspects of the present disclosure, the network service provider may implement the configuration service. Such configuration service can be used to configure the input data analysis pattern, such as by adjusting the input data analysis pattern based on the operator-defined attributes. For example, the configuration service can be characterized as effectively optimizing input data analysis patterns, such as analyzing the pattern of the context information of the input data based on the incorporation of operator-defined attributes. In some aspects, the configuration service may process these operator-defined attributes and configure the analysis pattern of the input data (e.g., the analysis pattern for analyzing context information of the input data). Moreover, the configuration service may feature a mechanism for validating operator-defined attributes, ensuring their accuracy and completeness of the input data analysis pattern before integrating the configuration (e.g., input data analysis configuration) into the network-based service. This validation step helps maintain the integrity of the input data analysis and ensures that the configurations are both relevant and effective. The operator, as disclosed herein, generally refers to the person and/or entity having authorization (e.g., authorized by the network service provider) to access the configuration service. In non-limiting examples, such person and/or entity can include system developer(s), system administrator (s), and the like. The present disclosure does not limit the types and number of operators. Furthermore, the operator can also include the computing device used by the operator, such that actions attributed to an "operator" can correspond to actions implemented by a computing device controllable by the operator. The types of the input data analysis pattern as disclosed herein are merely illustrated as examples, and the present disclosure does not limit these types of the input data analysis pattern. In the context of configuring a search engine, the input data analysis pattern may include configuration values that may impact how the search engine can analyze the customer input (e.g., customer keywords). In some examples, the input data analysis pattern may represent how the search engine generates the output (e.g., search results). For instance, the input data analysis pattern can be utilized to determine ranking of search results regarding customer context that can be results of using various types of ranking algorithms.

Generally, each network-based service can include various components that can process the customer's input data and provide the processed results. For instance, an e-commerce platform (e.g., e-commerce service provider) may implement an optimized input data analysis configuration that is fine-tuned to interpret customer input data and present corresponding product listings. In another instance, a music streaming service can be configured to process the input data and provide matching musical content. Embodiments, as disclosed herein, can provide a configuration service configured to provide configurations of analyzing input data. The configuration can be the pattern of the input data analysis. For example, the configuration can define how the input data can be analyzed, such as how the context information of the input data is interpreted. The configuration service can generate the configuration based on operator-defined inputs (e.g., operator-defined inputs). The configuration disclosed herein generally refers to an input data analysis configuration that operational parameters of the configuration can be determined based on the operator-defined attributes. These operational parameters can be related to analyzing the context of the input data. For example, the operator can provide operator-defined attributes, such as "US market: automotive." In this example, the operational parameters can be configured to analyze the input data with the context based on the "US market: automotive." For example, if the input data is "Sedona," the context of the input data can be analyzed by the vehicle's name being "Sedona" in the US market.

In some aspects of the present disclosure, the configuration service can provide configuration attributes to the operator. These configuration attributes can be provided as data structures that define attributes of the input data analysis configuration. For example, these attributes can be related to the context information analysis pattern of the input data. In some embodiments, the configuration service can provide an interface that can obtain the operator-defined values or variables of each attribute. In these embodiments, the operator can define the value of each attribute in manners utilizing various computer programming languages, including but not limited to C, C++, C#, Java, Python, Rust, etc. The present disclosure does not limit these types of programming languages.

In some aspects, the configuration service can process the operator-defined inputs and generate configurations that each configuration provides a specific input data analysis pattern. In these aspects, the configuration service can parse received operator-defined inputs and determine values or variables for each attribute of the configuration. For example, the operator-defined inputs can define a scope of certain attributes, and the configuration service can parse the operator-defined inputs to determine the scope to generate the input data analysis configuration. In some embodiments, the configuration service can conduct further process the operator-defined input, such as error correction, extrapolation, or other types of adjustments.

In some aspects, the configuration service can validate the operator-defined inputs. In some examples, the configuration service can validate each operator-defined value or variable for each attribute to determine any configuration errors. In these aspects, the configuration service can compile the configuration configured based on the operator-defined inputs and identify errors. In some embodiments, the configuration service can perform the conflict checking according to one or more embodiments disclosed herein. The conflict checking can be performed to determine conflict errors, such as operator-defined input data discrepancy between two or more attributes. In some embodiments, the configuration service can also perform completeness checking in accordance with one or more embodiments disclosed herein. The completeness checking can also be performed by compiling the input data analysis configuration, and the completeness checking errors can be discovered if one or more fields of the attributes are undefined.

Generally, traditional input data analysis configuration for using network-based services presents significant technical challenges for operators and network-based service providers. Specifically, the input data analysis configuration can be compiled and implemented in the network-based service. Compiling the input data analysis configuration can be performed to validate the input data analysis configuration, such as to detect any run-time error(s). However, compiling the input data analysis configuration engine may not reveal errors, but during the post-implementation, the input data analysis configuration may not provide its input data analysis operation as the operator intended. For example, the implemented input data analysis configuration may analyze the context of the input data deviated from the operator (e.g., operator-defined attributes). Additionally, this deviation may only be detected after the configuration and network-based services have been implemented. In one scenario, if an operator configures the input data analysis configuration by defining a portion of the attributes but leaves certain fields of the attributes undefined, the traditional system might automatically fill these fields with default values. Similarly, if there are conflicting values in various attributes during the compilation, the traditional system might resolve these conflicts by overriding them with default values. Even when some attribute fields are not specified by the operator, the traditional system could assign default attribute values to these fields. Although such configurations with default attributes might pass the compilation stage without any errors, they could lead to unintended input data analysis operations once implemented. This is because the operational parameters of the input data analysis configuration are influenced by default values rather than solely by operator-defined attributes. Moreover, post-implementation errors may arise due to these entered default attribute values, which could conflict with other operator-defined values or may not be in accordance with them.

Another challenge that traditional network service providers may face is debugging an input data analysis configuration once it has been implemented into the network-based service (e.g., after compilation). If the input data analysis configuration operates differently than the operator intended, it necessitates a thorough analysis of this unintended operation along with a validation of the attributes and their parameters. For instance, if an operator specifies a value such as "US market: 'undefined'," a traditional system might replace the 'undefined' field with a default value, like "national park." In this scenario, the input data analysis configuration, which is set to analyze the context of the input data, could default to interpreting the input data in the context of "US national park." Consequently, even if the operator's intention was to find information about vehicles sold in the US market, the search might limit its context analysis to US national parks. Taking this further, if the operator's input data is "Sedona," the input data analysis configuration might analyze the input data based on the US national parks and return results related to the US national park named "Sedona," rather than information on the vehicle that the operator intended to find. Because the compilation process does not catch these errors, operators are often required to undertake manual debugging to resolve them. Even when errors are identified in the post-implementation of the input data analysis configuration, debugging these errors still demands a significant manual effort and debugging computing resources from the operator.

To address at least a portion of the above-described deficiencies, one or more aspects of the present disclosure correspond to systems and methods for providing input data analysis configuration and validating the input data analysis configuration prior to implementing the network-based service(s). According to one or more embodiments, as disclosed herein, an input data analysis configuration can be specified in a structured set of attributes in which the values for each attribute can be defined based on the operator-defined attributes and values or variables for each attribute. In some embodiments, a configuration service (e.g., the service that generates input data analysis configuration based on operator-defined attributes and values or variables) may analyze the operator-defined values for attributes required for generating the input data analysis configuration and validate the operator-defined values prior to deploying the generated input data analysis configuration to the network-based service. In some embodiments, this configuration service is designed not to auto-generate default values for any of the attributes' values. Instead, it would compile the configuration based on operator-defined inputs and present the results to the operator. These results would highlight any detected errors, specifically pointing out which operator-defined values are causing the errors. Thus, operators are provided with the opportunity to adjust and correct the problematic attribute values, resolving any errors before the generated input data analysis configuration is deployed into the network-based service. This proactive approach can aim to ensure that the network-based service analyze the input data based on operator-defined attributes (e.g., analyze the context information of the input data with operator's intention).

Illustratively, a network-based service may be configured to process user input data received from a customer of the network-based service. For example, the network-based service analyzes the user input data, such as analyzing the context information of the input data. This approach involves the network-based service understanding the input data's context. To further illustrate, the network-based service can be configured to analyze the nuances within the context of input data. In a context-based analysis, the analysis can be performed by defining various dimensions of a context space of the input data, with each dimension representing unique variations of context. In this context space, there would be various attributes corresponding to analyzing the input data. These attributes might include a subset that pertains to each dimension, as well as fields within each subset. In such examples, the network service provider can implement a configuration service that can generate the input data analysis configuration based on these provided attributes and their respective values, ensuring that the generated input data analysis configuration is finely tuned with the operator-defined attributes to the contextual elements of the input data.

In some embodiments, the operator can provide operator-defined values of each attribute, and the configuration service can perform the configuration of the input data analysis configuration based on the operator-defined values for each attribute. Illustratively, the operator can provide such values or variables for each attribute. In various examples, the configuration service may include the attributes utilized for configuring the input data analysis configuration, such as dimension, slice, record schema, configuration values, and the like, where these attributes can be provided as a set of data structures. In these embodiments, the operator can define the value or variable of each attribute in manners utilizing various computer programming languages, including but not limited to C, C++, C#, Java, Python, Rust, etc. The present disclosure does not limit these types of programming languages.

In some embodiments, the configuration service might incorporate a data structure designed to model the attributes' structure. For instance, at a high level, one part of the data structure could correspond to the definition of the context space, while another part could relate to the specific values assigned to each context space definition. At a lower level of the data structure, each defined context space could be broken down into its constituent subsets, with each subset being linked to its respective values. Additionally, the configuration service could allow for operator-defined constraints (e.g., operator-defined scope) to be applied between these subsets and/or dimensions of the context space, enhancing the precision and relevance of the input data analysis configuration. In various embodiments, such context space can be defined with a large number of dimensions, such as hundreds or thousands of dimensions, and also subset of each dimension can be defined with a large number of dimensions. The present disclosure does not limit these numbers, and the specific number of dimensions (and also the subset of each dimension) can be determined based on specific applications.

In some embodiments, the configuration service can allow the operator to determine the scope of the input data analysis configuration. The configuration service can provide a scheme that the operator can manually express the scope of the input data analysis configuration. The scope of the input data analysis configuration can generally refer to the operator-defined constraint(s), and the operator can define the scope by defining relationships between the dimensions and/or fields of subsets. In some examples, these scopes can be expressed in various expression methods, such as operators (e.g., binary operators), keywords, or predicate functions.

Illustratively, the configuration service can validate the input data analysis configuration attributes, their defined values, and the variables defined in the scope by compiling the input data analysis configuration (e.g., configuration configured based on the operator-defined inputs) prior to deploying the configuration to the network bases service(s). In some embodiments, the validation can include a conflict checking and a completeness checking. For example, conflict checking can be performed to determine conflict data between operator-defined values or variables for each attribute or discrepancy between two or more attributes. The completeness checking can also be performed by compiling the input data analysis configuration, and the completeness checking errors can be discovered if one or more fields of the attributes are undefined.

With continued reference to the examples, these error(s) (e.g., occurred during the conflict checking or completeness checking) can be detected during the compilation. For example, during the compilation, these error(s) can be provided as run-time errors with the indication of fields corresponding to the subset and/or dimension. For example, if the completeness checking shows an error that a field of a subset is undefined, the operator can define the field value. In another example, if the conflict checking result shows that two subsets include the same value in their fields, the operator can confirm these values. Thus, the configuration of the input data analysis configuration can be performed based on the operator's intention by configuring it with operator-defined values (without automatically generating default values). Therefore, the accuracy and reliability of the input data analysis configuration can be improved. Furthermore, since the operator can detect the error(s) during the compilation stage prior to deploying the input data analysis configuration, the operator can debug the configuration more efficiently than the traditional configuration system, which requires a significant manual effort and debugging computing resources from the operator.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1A depicts a block diagram of an embodiment of a system 100A. The system 100A can include a network 150, the network connecting a number of customer computing devices 102 and services (112A-112C) provided by a network service provider 110. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices.

Network 150, as depicted in FIG. 1A, connects the devices and modules of the system. The network can connect any number of devices. Network 150 may include any combination of wired and/or wireless networks, such as one or more direct communication channels, local area network, wide area network, personal area network, and/or the Internet, for example. In some embodiments, the network 150 can be formed based on a high-speed 4G LTE or other wireless communication technology, such as 5G communications. Thus, in some embodiments, the network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, a network service provider 110 can provide network-based services to customer computing devices via a network 150. In some embodiments, the network service provider 110 may implement network-based services and refers to a large, shared pool of network-accessible computing resources (such as compute, storage, or networking resources, applications, or services), which may be virtualized or bare-metal. The network service provider 110 can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provides those services.

The customer computing device 102 in FIG. 1A can connect to the network 150 and the network service provider 110. The customer computing device 102 may be representative of a computing network associated with a plurality of customer computing devices. Solely for illustration purposes, customer computing device 102 represents a customer's action to access to the services 112. Generally, the customer computing device 102 attempts to use the service 112 by providing input data to the corresponding service 112.

In some embodiments, the customer computing device 102 is configured to access various network-based services through the network 150. In these scenarios, the customer may use such services by providing input data. For example, in an e-commerce service, a customer, via the customer computing device 102, could search for products of interest. Here, the customer may submit input data through the computing device 102 to the corresponding service 112, which then the service 112 processes and retrieves products relevant to that input data. The customer computing device 102 may also be equipped with at least one processor capable of communicating with memory to store and execute computer-readable instructions. This device can be either a physical or virtual machine and may encompass a range of devices, including mobile devices, personal computers, servers, or other computing platforms. Typically, the customer computing device 102 will feature a display and input mechanisms, allowing the operator to interact with its operator-interface components. The present disclosure does not limit the number and types of the customer computing device 102, and these numbers and types can be determined based on specific applications.

Illustratively, the network service provider 110 can include a plurality of network-based services that can provide functionality responsive to requests transmitted by the customer computing devices 102, such as in the implementation of a set of microservices that are configured to provide underlying functionality to applications hosted by a service provider. As illustrated in FIG. 1A, the network service provider 110 can include a set of network-based services 112A, 112B, 112C, etc. (generally referred to as network-based services, network services, or services). Illustratively, each service can be configured with defined functions that can be accessed based on communication or executable commands. One or more services 112 can be accessed directly with communications transited by the customer computing device 102 via various interfaces. Additionally, one or more services 112 may also be considered dependent services or complimentary services that are accessed based on communications or commands from other services. Such dependent or complimentary services 112 may or may not be directly accessible to communications from the customer computing device 102 (even if the execution of the dependent or complimentary services is being performed on behalf of the customer). Without limitation, service 112 can include virtualization services, streaming services, input data processing services, data processing services, data storage or warehousing services, analytics services, database services, monitoring services, security services, content delivery services, and the like.

For the purpose of this application, as described herein, each of the services 112A, 112B, 112C can communicate with the configuration store 114 as an integral feature. The configuration store 114 can include a set of input data analysis configurations (hereinafter "configuration 116"). For example, each configuration 116 can define attributes and their values or variables for analyzing the input data received from the customer computing device 102. For instance, each configuration 116 can be defined with a specific analysis pattern of the input data, such as interpreting the context information of the input data based on operator-defined inputs, as described in detail with respect to FIG. 1B. In some embodiments, each service 112A utilizes one or more configurations 116 stored in the configuration store 114. For example, the service 112A may receive the input data from the customer computing device 102 and analyze the input data by selecting configuration 116 from the configuration store 114. In some embodiments, each service 112 could potentially exhibit hundreds of distinct configurations, any of which might be applied to a given input data.

In some embodiments, the network service provider 110 may include a datastore 118, which can also be known as a settings store. The datastore 118 can be designed to store the attributes and their corresponding values for each configured configuration 116. For instance, it may feature a lookup table that catalogs these values for every configuration 116 included in the configuration store 114. Additionally, in some embodiments, each configuration 114 could be converted into an index file structure. This structured index would then be stored within the datastore 118. In certain situations, the datastore 118 is responsible for maintaining a registry of attributes that are used for each configuration.

Figure 1B:
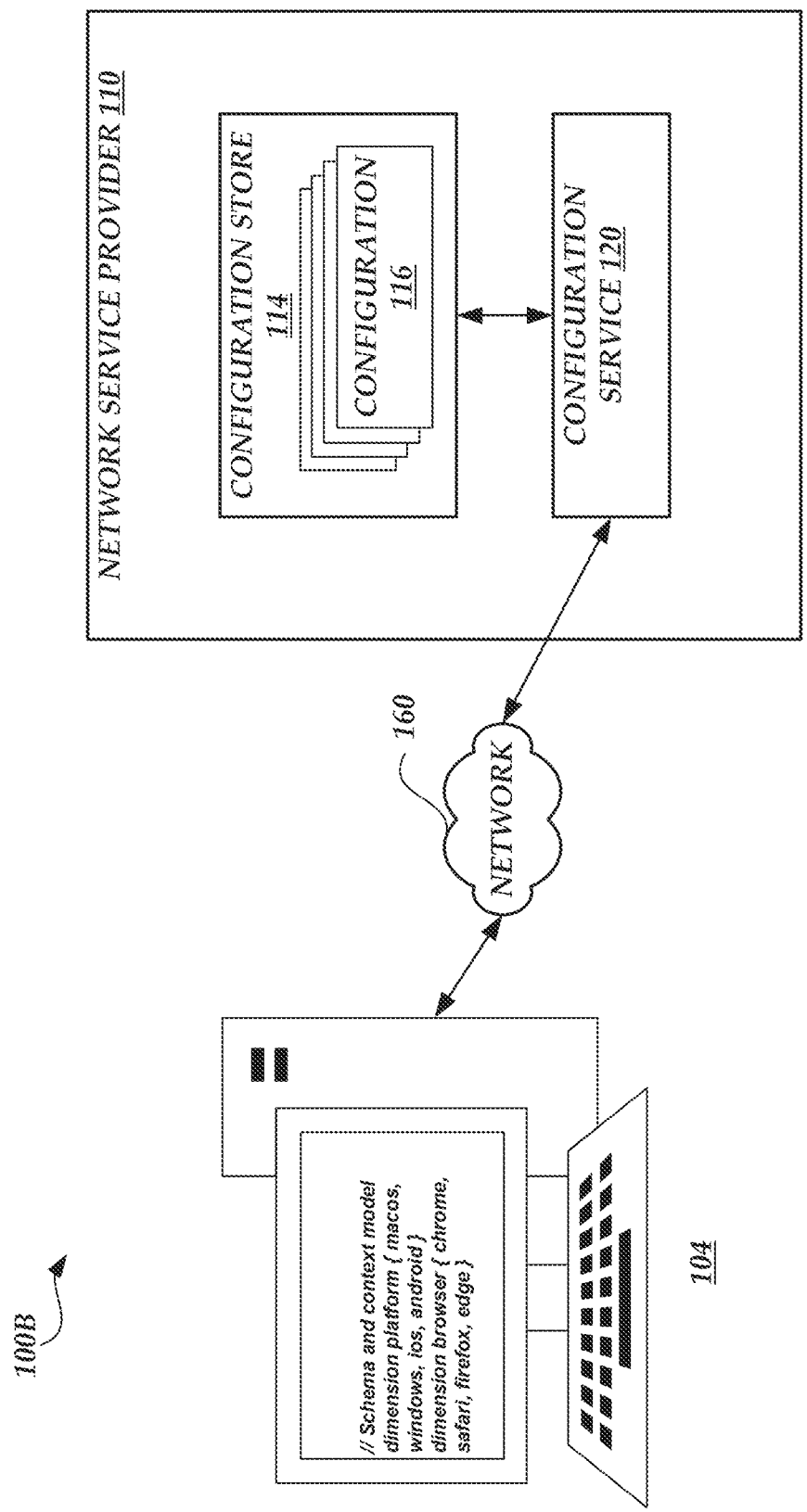
FIG. 1B is a block diagram of illustrative components of a network system that includes an operator computing device and a configuration service to configure input data analysis configurations according to one or more embodiments.

FIG. 1B illustrates a block diagram of a system 100B in accordance with one or more embodiments. This system can include a network 160, which links an operator computing device 104 to a configuration service 120 implemented in a network service provider 110. In some examples, the term "operator" broadly refers to any individual, group, or organization with the authorization to set up the input data analysis configuration through the configuration service 120. Operators could include, but are not limited to, developers, researchers, system administrators, and network-based service providers. These operators may operate the operator computing devices 104 to input their configurations into the service 120.

Network 160, as depicted in FIG. 1B can connect the operator computing device 104 and the configuration service 120. The network 160 may include any combination of wired and/or wireless networks, such as one or more direct communication channels, local area network, wide area network, personal area network, and/or the Internet, for example. In some embodiments, the network 160 can be formed based on a high-speed 4G LTE or other wireless communication technology, such as 5G communications. Thus, in some embodiments, the network 150 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some implementations, the network service provider 110 may include a configuration service 120. This configuration service 120 may allow for the customization of the configuration store 114 (e.g., by modifying existing configuration 116 or adding additional configuration 116) based on operator-defined inputs provided by the operator's computing device 104. The phrase configuration can generally refer to the data structure that defines the analysis pattern of the input data provided by customer computing device 102

(shown in FIG. 1A). In some embodiments, by defining specific attribute values and/or variables of each attribute of a configuration, the configuration can be generated, where the generated configuration can analyze the context information of the input data based on the defied attribute values and/or variables. For instance, these contexts might be linked to input data, with configuration service 120 involving the assignment of particular configurations to each input data type for specific service 112.

In some embodiments, the operator, through the use of the operator computing device 104, can provide operator-defined inputs to the configuration service 120. These operator-defined inputs can be instrumental in creating configuration(s). For instance, the configuration service 120 can generate configuration 116 by incorporating values defined by the operator for each attribute required for generating the configuration. As configuration 116 can be derived from these operator-specified attribute values, the configuration store 114, upon implementing configuration 116, may exhibit input data analysis configurations as determined by the operator.

In various examples, the operator-defined inputs may include defined values or variables for each attribute of the configuration service 120. The configuration service 120 can include various attributes, such as dimension(s), slice(s), record schema(s), type(s), and configuration(s). The detail description of each attribute is described with respect to FIG. 2A. All or a portion of these attributes can be leveraged to tailor the configuration store 114 by creating the configuration 116. In such instances, the operator has the ability to set values for each attribute, thereby ensuring that the input data analysis can be based on the operator's objectives.

In some embodiments, the operator, via the operator computing device 104, can provide the operator-defined inputs to the configuration service 120. In these embodiments, the operator-defined inputs can be provided by utilizing various computer programming languages, including but not limited to C, C++, C#, Java, Python, Rust, etc. In some examples, the operator may define the attributes and values (or variables) for each attribute by utilizing the computer programming language. In some cases, the operator can further define the configuration scope of the input data analysis configuration. Such scope can refer to the constraint of the configuration 116.

Upon receiving the operator-defined inputs from the operator via the operator computing device 104, the configuration service 120 can process these inputs to create one or more configurations 116. In certain scenarios, the operator-defined inputs may also specify the configuration by setting its scope of attributes, such as a combination of one or more attributes with operator-defined values and variables for each attribute. The configuration service 120 then compiles this generated configuration 116, which may include a validation step as part of the compilation process. For instance, the configuration service 120 could conduct checks for conflict and completeness as part of the compilation. These checks are intended to validate the operator-defined inputs. The conflict check may aim to identify any conflicting data within the inputs, while the completeness check can be designed to ascertain if any attributes have been left undefined in the operator's inputs. In some cases, the configuration service 120 may not automatically correct any error(s) that occurred during these checks. Instead, the configuration service 120 can provide these identified errors (s) to the operator so the operator can update the values or variables associated with the error(s). By allowing the operator to update these values or variables (without correcting the error(s) automatically by overriding it with default values), the input data analysis configuration can be based on the operator's intended configuration.

In some scenarios, the configuration service 120 may send compilation results to the operator computing device 104. The compilation results may include the identification of a portion of the operator-defined values of the attributes that caused the failure in the conflict and/or completeness checking (e.g., provided as compilation error(s)). The operator, upon identification of the portion of the operator-defined values, may correct these values.

Figure 2A:
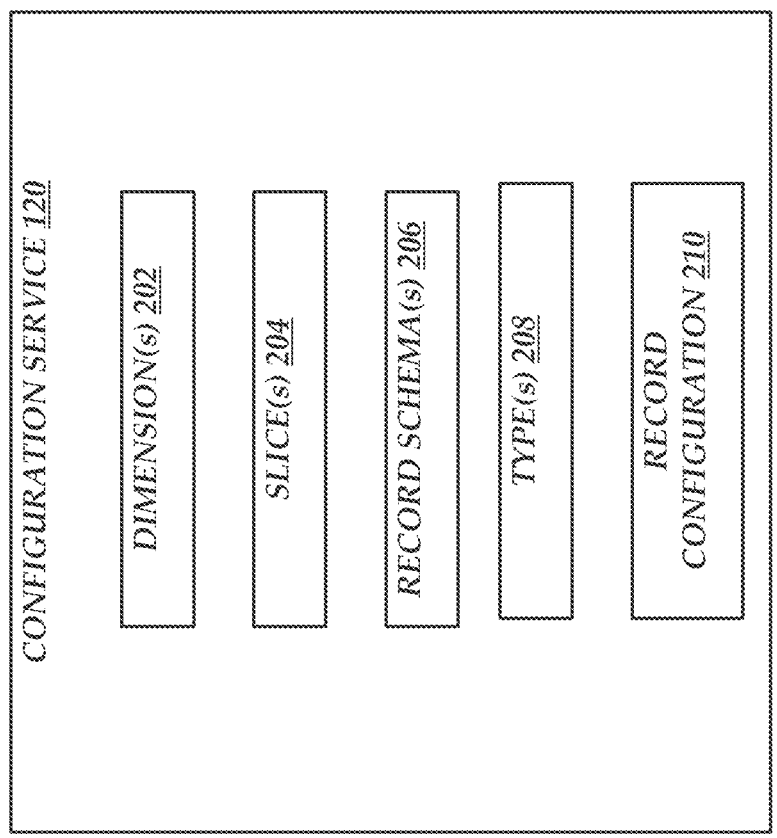
FIG. 2A illustrates a configuration model according to one or more embodiments.

FIG. 2A illustrates a block diagram of an example of the configuration service 120. As shown in FIG. 2A, the configuration service 120 may include attributes, such as dimension(s) 202, slice(s) 304, record schema(s) 206, type(s) 208, and record configuration(s) 210. All or at least a portion of these attributes can be required to configure the configuration store 114 (shown in FIGS. 1A and 1B). For example, defining these attributes (or a portion of the attributes) may correspond to contexts of input data, such that the configuration (e.g., generated by defining values of these attributes) may define the input data analysis related to analyzing the contexts of input data.

The dimension(s) 202 can be defined as dimensions in the context space. For example, each dimension can define a set of mutually exclusive variables. For example, a input data can have two dimensions, marketplace and collection dimensions, and can be defined as shown below.

dimension marketplace {us, uk, de, fr, it, es, }dimension collection {aps, automotive, baby, books, hardlines, . . . }

The slice(s) 204 can represent a subset of the context space. In some examples, each slice 204 can constraints the dimension 202 by further defining the dimension 202 with variables. An example of slices that constraint a single dimension can be defined as shown below.

```
// simple slices constrain a single dimension
slice US { marketplace: us }
slice FRITES { marketplace: fr | it | es }
slice APS { collection: aps }
slice Hardlines { collection: automotive | baby | ... | hardlines ... }
slice softlines { collection: apparel | softlines | shoes | clothing | ... }
```

For the purpose of example, the slice is shown above with respect to a single dimension. However, the slice can define multiple dimensions.

The record schema(s) 206 can define a schema for a group of named fields that need to be defined with names or values. For example, the record schema 206 may include a name, scoping slice, and one or more fields with their defined type. In various examples, the record schema(s) 206 can be defined with various keywords, such as "requires," "abstract," "const," etc. An example of record schema 206 with the name, scoping slice, and the fields can be shown below.

fieldset FieldsetName for ScopingSlice {
    field_name1: type_expression1,
    field_name2: type_expression2,
}

The type(s) 208 can define configuration values. In some examples, the type(s) 208 can be defined with built-in primitive types, including bools, numeric, and strings. For example, as shown below, the "KNNDstance" can be defined as a float, and the "ModelName" can be defined with strings with the or operator "|."

The record configuration(s) 210 can define values for a subset of the fields in the record schema(2) 206. The record configuration(s) 210 can be utilized as declarative valued for the configuration. For example, if the record configuration(s) 210 declares that a filed has a value in a slice, then all contexts in that slice have the value. An example of record configuration(s) 210 with declaring value for the USCategory slice can be shown below.

```
config SemanticMatching for US Category {
   knn_threshold: 0.6,
   knn_topk: 15,
}
type KNNDistance = 0.0..1.0    // float between 0.0-1.0, inclusive
type ModelName = "msq_dssm_global_emb_h128" // one of these exact strings
   | "msq_dssm_global_emb_h256"
   | "dssm_sp_asin_emb_h256"
```

Figure 2B:
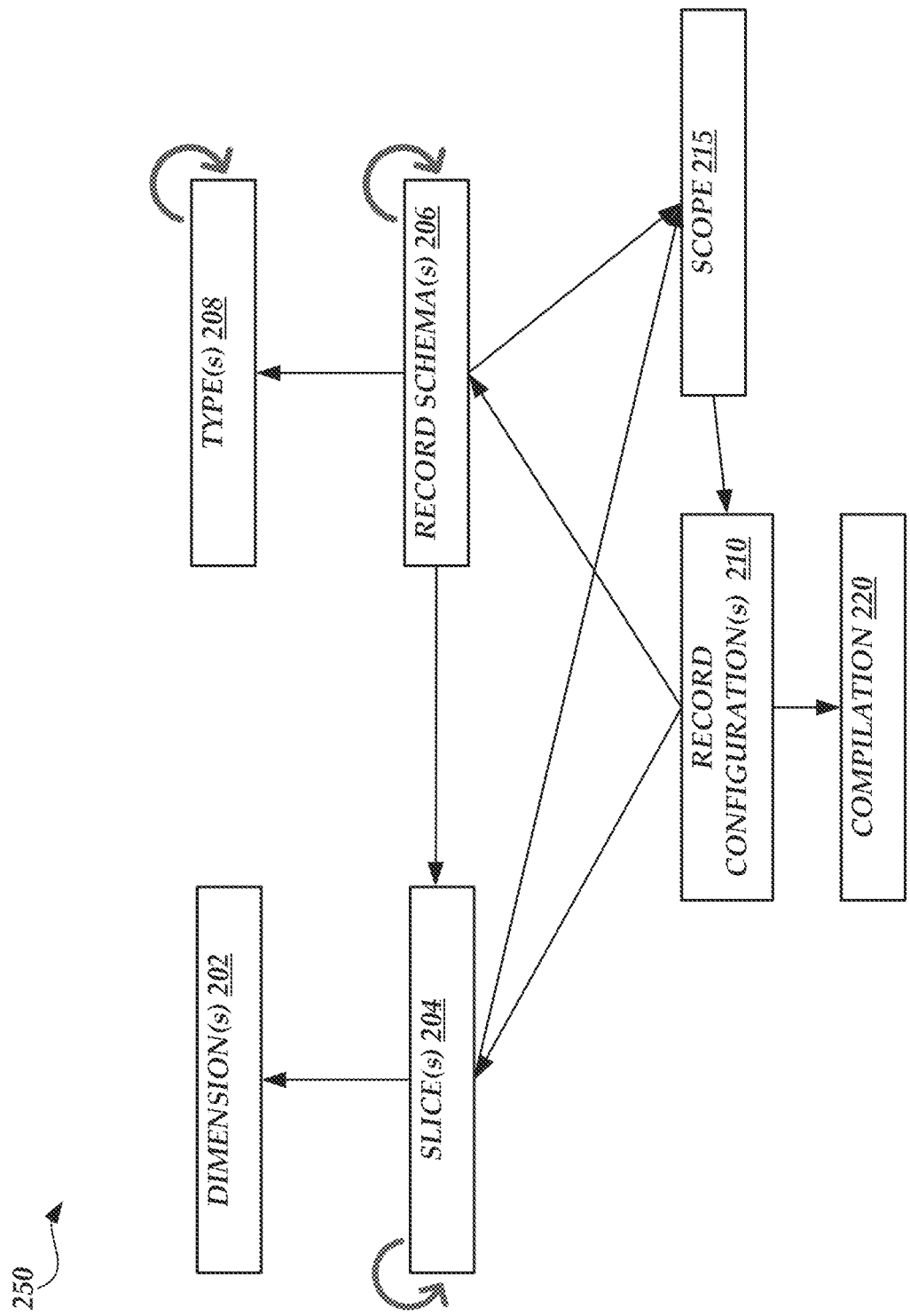
FIG. 2B illustrates a block diagram of an example of the configuration service, according to one or more embodiments.

FIG. 2B illustrates an example of a configuration model 250. As illustrated in FIG. 2B the configuration model 250 can include the attributes, such as the dimension(s) 202, slice(s) 304, record schema(s) 206, type(s) 208, and record configuration(s) 210. The arrows shown in FIG. 2B can indicate references between attributes of the configuration model 250. For example, the record configuration(s) 210 can define values with reference to the slice(s) 204 and record schema(s) 206. Also, the slice(s) 204 can represent the subset of the dimension(s) 202, and the record schema(s) 206 can define the constraints of the fields defined in the type(s) 208. In addition, the record schema(s) 206 can define scope(s) by utilizing the slice(s) 204. In some examples, the slice(s) 204, the record schema(s) 206, and type(s) 208 can further define the subset of its defined values. For example, slice(s) 204 can serve as a reference to the record schema(s) 206 and configuration(s) 208. In this example, the slice(s) 204 can define the subset of the context space where it is valid for that record schema's fields to be set. In record configuration(s) 210, the slice(s) 204 can define the subset of the context space where that configuration(s) field values are set. These slice(s) 204 can be defined as active slice(s).

In some embodiments, the configuration service 120 can provide a context lookup application programming interface (API). In these embodiments, the lookup API can provide defined record schemas for a context. Thus, the configuration can be generated by assembling the record configuration(s) 210 that corresponds to the context. For example, the sequence of the context lookup API can include:
  finding which slices apply to the context;

```
# Step 1
def lookup_slices_by context (self: SettingStore, context: Context) -> Set[SliceId]:
  return
    set.intersection(*[slices_by_dimension [dimension]
    [ variant ]
       for dimension, variant in context.items ( ) ])
def lookup_configs_by_context (self: SettingStore, context: Context) -> Set[ConfigId]:
``` finding active slice that applies to the context;
  #Step 2
    slice_ids=self.lookup_slices_by_context    (context)
      assert(len(self.active_slices.intersection(slice_ids)) !=0)

fining those slices' configurations; and
    configs_ids: Set[ConfigId]=set ( )
    for slice_id in self.lookup_slices_by_context(context):
       config_ids|=self.configs_by_slice[slice_id]
    return config_ids
  assembling together those configurations' record schema.

```
def lookup_fieldset_by_context(self: SettingStore,
context: Context, fieldset_id: Fi
  values: Optional[FieldsetValues] = None
  for config_id in
  self.lookup_configs_by_context(context):
    config: Config = self.configs[config_id]
    if self.configs[config_id].fieldset_id !=
  fieldset_id:
      values = value of { }
      values.update(self.configs[config_id].values)
  return values
```

In some embodiments, the configuration service 120 can provide the operator to define a scope 215. The scope 215 can generally refer to operator-defined constraints that can be declared independently from record schema(s) 206 and/or slice(s) definitions. Instead, the scope constraints can be defined by the operator and utilized as a means of testing and debugging the record configuration(s) 210. In various examples, the scope 215 can be expressed with a simple infix grammar, with the expression of "|, @, or &" similar to the slice expression. In some examples, unlike the slice expression, the scope 215 can be expressed by referencing the record schema(s) 206. The scope 215 can be expressed with infix operators, such as |(for union) and &(for intersection), whereas these infix operators are grouped with parenthesis ( ), as shown below example of the scope expression.
  //Union of slices A, B, C
  A|B|C
  (A|B|C)//surrounding parentheses can be used for clarity
  //Intersection of slice A with the scopes of fieldsets X and Y
  A & @X & @Y
  //When combining union and intersection, parentheses are required
  (A|B|C) & D this is ok
  A|B|(C & D) this is ok too
  A|B|C & D//SYNTAX ERROR: not permitted
  //Intersection of the scopes of fieldsets X and Y
  @X & @Y
  //Scope where fieldset Z and either of fieldsets X or Y are configured
  @Z & (@X|@Y)
  In some embodiments, the scope 215 can be expressed in various expressions, including infix with operators, infix with keywords, and predicate functions. For example, with the expression of the infix with operators, the scope 215 can be defined with set inclusion (e.g., <=) and set equality relates (==). With the infix with keywords expression, these set inclusion (e.g., <=) and set equality relates (==) can be replaced with the keywords, requires and is, respectively. With the predicate functions, these set inclusion (e.g., <=) and set equality relates (==) can be replaced with the built-in binary predicates, such as "scope_requires( )" and "scope_equalso," respectively. In some embodiments, the scope 215 can be configured as the record configuration 210.

As further illustrated in FIG. 2B, the configuration model 250 can include a compilation 220. In some embodiments, the scope 215 and the record configuration(s) 210 can be compiled at compilation 220. The compilation 220 can be configured to compile the record configuration(s) 210, such that the compilation 220 can be utilized as a diagnostic tool. In some examples, the compilation 220 can be performed in two phases: parsing and lowering phases. In the parsing phase, the compilation source can be concatenated and parsed according to its grammar into an abstract syntax tree. For example, the data structure of the record configuration(s) 210 can be simplified by eliminating slice expressions and inlining type expressions, extends relation, and const field definitions. Thus, the representation of the slice(s) 204, record schema(s) 206, and configuration(s) 220 can be simplified. In some embodiments, during and after each compilation stage, various attributes and their associated operator-defined values can be validated. For example, the parsing can validate whether the source is syntactically valid. Following parsing, references in definitions can be validated to ensure they are defined; variables and fields can be checked for uniqueness in dimension, record schemas, and configuration definitions; and the reference relation can be validated to be acyclic. Lowering phase can validate that slice expressions are representable as slices as well as various properties of other slices definitions and dimension definitions that are related to the slices. Following lowering, a set of local checks can be performed on all definitions. Local checks can validate any attributes that depends only on a definition and its direct references. For example, the local checks can include validating whether the type expressions have a consistent representation and whether the scoping slices are consistent between configurations and their record schemas. Following local checks can be global consistency checks, which validate properties of the entire configuration together.

The global consistency checks can be performed in two parts, a conflict check and a completeness check. The conflict check can be referred to as a conflict checking. The conflict check can be performed to validate that no two record configuration(s) 210 set a value of the same filed within the context. In some cases, the record configuration(s) 210 can be considered conflicting even if they set the field to the same value. For example, if two slices define the same variables, such as "US market and hardliners," these two slices can be marked an error as a result of the conflict check. This can ensure the attribute that every configured field value for the active slice(s) has exactly one value, determined by exactly one configuration.

The completeness check can validate that in whichever contexts configurations for a record schema exist, all the fields within the record schema should be defined. In some examples, the completeness check for each record schema can be performed based on the below sequence:
 computing, for each field, the scope 215 in which that field has values defined;
 unioning these scopes and computing the scope by spanning the points in which any of the fields of the record schema have values defined;
 computing the scope of the intersection of each field's scope and the record schema's scope, according to the union of their slices intersection product space; and
 computing the cardinality of each scope, for example by using the inclusion exclusion principal.

In this sequence, the completeness check can validate the record configuration 210 when each of these scopes (the record schema, its fields, and the intersections thereof) covers the same set of points. Thus, the completeness check can validate the completeness when those scopes have equal cardinality.

Figure 3:
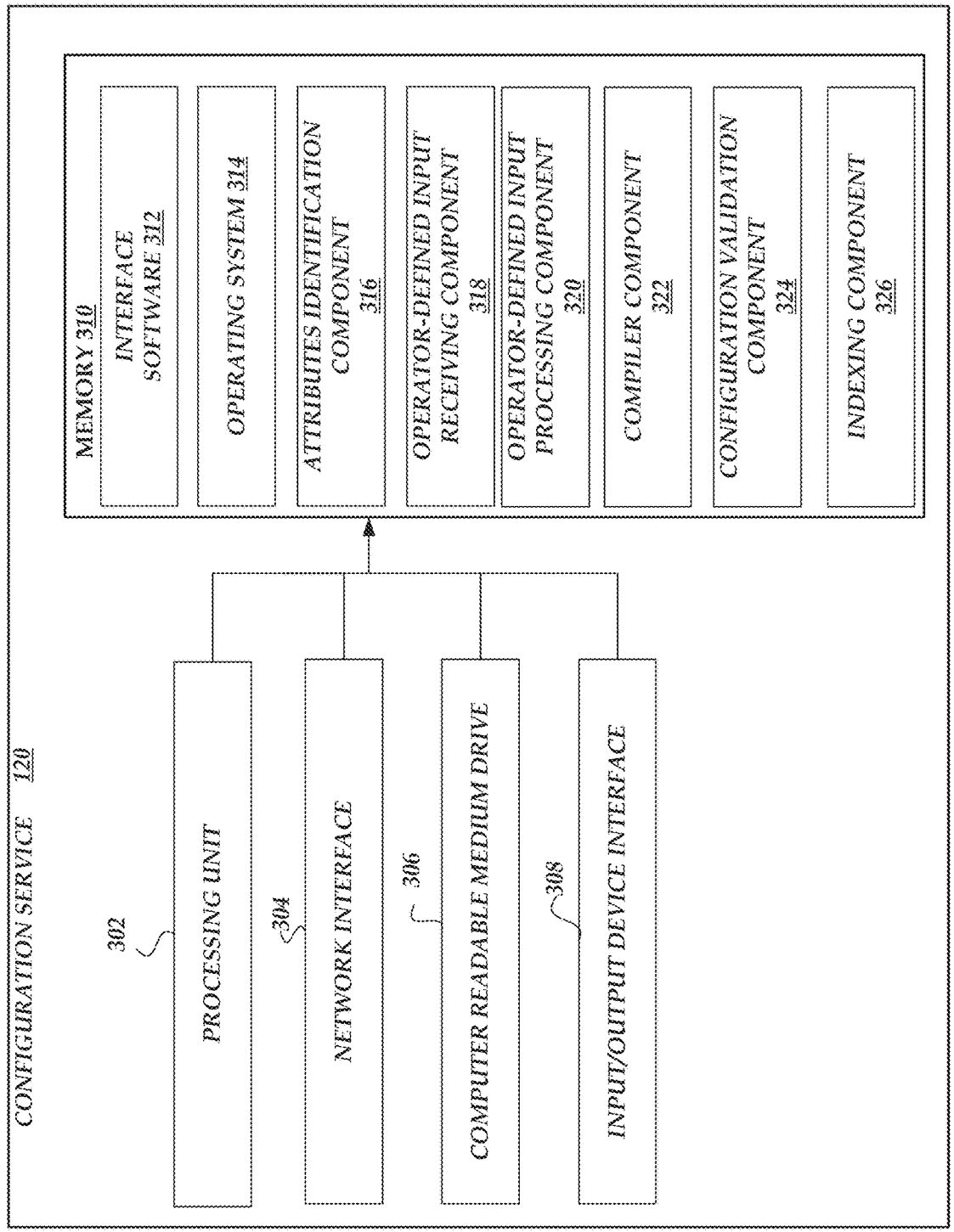
FIG. 3 depicts one embodiment of an architecture of an illustrative configuration service, according to one or more embodiments.

FIG. 3 depicts one embodiment of the architecture of an illustrative configuration service 120. The configuration service 120 can be configured to analyze operator-defined input, process the analyzed operator-defined inputs, generate configuration(s) (e.g., input data analysis configuration) corresponding to the identified attributes and operator-defined values of the attributes, compile the configuration(s), validate the configuration(s), etc. In some embodiments, the configuration service 120 can identify operator-defined values associated with each attribute of the configuration, where the operator-defined inputs are obtained from the operator computing device 104 (shown in FIG. 1B). In some embodiments, the configuration service 120 may identify configurations of the input data analysis configuration based on the operator-defined inputs. In some embodiments, the configuration service 120 receives the operator-defined inputs in various programing languages, including but not limited to C, C++, C#, Java, Python, Rust, etc. In some embodiments, the operator can further define scopes, and the configuration service 120 can generate the configurations based on each scope. Additionally, the configuration service 120 can validate the operator-defined inputs (e.g., operator-defined inputs that include operator-defined values for each attribute) by performing various checking mechanisms, such as a conflict check and completeness check. The general architecture of the configuration service 120 depicted in FIG. 3 can include an arrangement of computer hardware and software components that may be used to implement aspects of the present disclosure. As illustrated, the configuration service 120 can include a processing unit 302, a network interface 304, a computer-readable medium drive 306, and an input/output device interface 308, all of which may communicate with one another by way of a communication bus. The components of the configuration service 120 may be physical hardware components or implemented in a virtualized environment.

The network interface 304 may provide connectivity to one or more networks or computing systems, such as the network 160 of FIG. 1B. The processing unit 302 may thus receive information and instructions from other computing systems or services via a network. The processing unit 302 may also communicate to and from memory 310 and further provide output information for an optional display via the input/output device interface 308. In some embodiments, the configuration service 120 may include more (or fewer) components than those shown in FIG. 3.

The memory 310 may include computer program instructions that the processing unit 302 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the configuration service 120. The memory 310 may further include computer program instructions and other information for implementing aspects of the present disclosure. For example, in one embodiment, the memory 310 includes interface software 312 for communicating with other components or services and performing service identification and infrastructure configuration associated with the identified services.

The memory may include an attributes identification component 316. These attributes would be necessary for configuring the input data analysis configuration. In some examples, the attributes can include dimension(s) 202, slice(s) 304, record schema(s) 206, type(s) 208, and record configuration(s) 210. In various embodiments, configuring the input data analysis configuration can involve assigning specific values or variables (e.g., property) to each attribute. In these embodiments, when these values are defined based on operator-specified inputs, they can configure the input data analysis configuration based on the operator-defined attributes. In some instances, the attribute identification component 316 can be designed to identify these attributes by accessing a datastore 118. In such embodiments, the attribute identification component 316 can relay the identified attributes to the operator (for example, to the operator's computing device), enabling the operator to specify values for each attribute accordingly.

The memory may also include an operator-defined input receiving component 316. In some cases, the operator can define values and/or variables for each attribute. For example, the dimension(s) 202 can be defined as dimensions in the context space. Further, in this example, a context of input data can have two dimensions, market place and collection dimensions, and can be defined as shown below.

dimension marketplace {us, uk, de, fr, it, es, } dimension collection {aps, automotive, baby, books, hardlines, . . . }

In some examples, the slice(s) 204 can represent a subset of the context space. For example, each slice 204 can constrain dimension 202 by further defining the dimension 202 with variables. An example of slices that constraint a single dimension can be defined as shown below.

```
// simple slices constrain a single dimension
slice US { marketplace: us }
slice FRITES { marketplace: fr | it| es }
slice APS { collection: aps }
slice Hardlines { collection: automotive | baby | ... }
slice Softlines { collection: apparel | softlines | shoes
  | clothing | ... }
fieldset FieldsetName for ScopingSlice {
   field_name1: type_expression1,
   field_name2: type_expression2,
}
```

In some cases, the record schema(s) 206 can define a schema for a group of named fields that need to be defined with names or values. For example, the record schema 206 may include a name, scoping slice, and one or more fields with their defined type. In various examples, the record schema(s) 206 can be defined with various keywords, such as "requires," "abstract," "const," etc. An example of record schema 206 with the name, scoping slice, and the fields can be shown below.

In some instances, the type(s) 208 can define configuration values. In some examples, the type(s) 208 can be defined with built-in primitive types, including bools, numeric, and strings. For example, as shown below, the "KNNDstance" can be defined as a float, and the "ModelName" can be defined with strings with the or operator "I."

```
type KNNDistance = 0.0..1.0   // float between 0.0-
1.0, inclusive
type ModelName = "msq_dssm_global_emb_h128"   // one of
these exact strings
  | "msq_dssm_global_emb_h256"
  | "dssm_sp_asin_emb_h256"
```

In various examples, the record configuration(s) 210 can define values for a subset of the fields in the record schema (2) 206. The record configuration(s) 210 can be utilized as declarative valued for the configuration. For example, if the record configuration(s) 210 declares that a filed has a value in a slice, then all contexts in that slice have the value. An example of record configuration(s) 210 with declaring value for the USCategory slice can be shown below.

```
config SemanticMatching for USCategory {
   knn_threshold: 0.6,
   knn_topk: 15,
}
```

The above operator-defined inputs are merely provided as examples, and these operator-defined inputs can be determined based on specific applications.

The memory can further include an operator-defined input processing component 320. In some embodiments, the configuration service 120 can provide a configuration model 250 (shown in FIG. 2B) to process the operator-defined input.

In some embodiments, the configuration model 250 can include the attributes, dimension(s) 202, slice(s) 304, record schema(s) 206, type(s) 208, and record configuration(s) 210 (shown in FIG. 2B). Each attribute of the configuration model 250 can process its values or variables (e.g., included in the operator-defined input) by referencing between other attributes of the configuration model 250. For example, the record configuration(s) 210 can define values with reference to the slice(s) 204 and record schema(s) 206. Also, the slice(s) 204 can represent the subset of the dimension(s) 202, and the record schema(s) 206 can define the constraints of the fields defined in the type(s) 208. In addition, the record schema(s) 206 can define scope(s) by utilizing the slice(s) 204. In some examples, the slice(s) 204, the record schema(s) 206, and type(s) 208 can further define the subset of its defined values. For example, slice(s) 204 can serve as a reference to the record schema(s) 206 and configuration(s) 208. In this example, the slice(s) 204 can define the subset of the context space where it is valid for that record schema's fields to be set. In record configuration(s) 210, the slice(s) 204 can define the subset of the context space where that configuration(s) field values are set. These slice(s) 204 can be defined as active slice(s).

In some embodiments, the configuration service 120 can provide a context lookup application programming interface (API). In these embodiments, the lookup API can provide defined record schemas for a context. Thus, the configuration can be generated by assembling the record configuration(s) 210 that corresponds to the context. For example, the sequence of the context lookup API can include:

determining slices, the slices applied to a context;
Step 1
  def lookup_slices_by_context (self: SettingStore, context: Context)→Set[SliceId]:
    return
    set.intersection(*[slices_by_dimension[dimension]
      [variant]
      for dimension, variant in context.items ( )]) def
        lookup_configs_by_context (self: SettingStore,
        context: Context)→Set[ConfigId]
determining active slices from the slices;
Step 2
  slice_ids=self.lookup_slices_by_context (context)
  assert(len(self.active_slices.intersection(slice_ids)) !=0)
generating one or more input data analysis configuration,
  each of the one or more input data analysis configuration corresponding to each of the active slices; and

```
config_ids: Set[ConfigId]=set( )
for slice_id in self.lookup_slices_by_context(context):
    config_ids|=self.configs_by_slice[slice_id]
return config_ids
```
assembling record schemas of the generated one or more configurations.

```
def lookup+fieldset_by_context(self: SettingStore,
context: Context, fieldset_id: Fi
    values: Optional[FieldsetValues] = None
    for config_id in
    self.lookup_configs_by_context(context):
        config: Config = self.configs[config_id]
        if self.configs[config_id].fieldset_id !=
        fieldset_id:
            values = values or { }
            values.update(self.configs[config_id].values)
return values
```

In some embodiments, the configuration service 120 can provide the operator to define a scope 215. The scope 215 can generally refer to operator-defined constraints that can be declared independently from record schema(s) 206 and/or slice(s) definitions. Instead, the scope constraints can be defined by the operator and utilized as a means of testing and debugging the record configuration(s) 210. In various examples, the scope 215 can be expressed with a simple infix grammar similar to the slice expression. In some examples, unlike the slice expression, the scope 215 can be expressed by referencing the record schema(s) 206. The scope 215 can be expressed with infix operators, such as |(for union) and &(for intersection), whereas these infix operators are grouped with parenthesis ( ), as shown below example of the scope expression.

//Union of slices A, B, C
A|B|C
(A|B|C)//surrounding parentheses can be used for clarity
//Intersection of slice A with the scopes of fieldsets X and Y
A & @X & @Y
//When combining union and intersection, parentheses are required
(A|B|C) & D this is ok
A|B|(C & D) this is ok too
A|B|C & D//SYNTAX ERROR: not permitted
//Intersection of the scopes of fieldsets X and Y
@X & @Y
//Scope where fieldset Z and either of fieldsets X or Y are configured
@Z & (@X|@Y)

In some embodiments, the scope 215 can be expressed in various expressions, including infix with operators, infix with keywords, and predicate functions. For example, with the expression of the infix with operators, the scope 215 can be defined with set inclusion (e.g., <=) and set equality relates (==). With the infix with keywords expression, these set inclusion (e.g., <=) and set equality relates (==) can be replaced with the keywords, requires and is, respectively. With the predicate functions, these set inclusion (e.g., <=) and set equality relates (==) can be replaced with the built-in binary predicates, such as "scope_requireso" and "scope_equalso," respectively. In some embodiments, the scope 215 can be configured as the record configuration 210.

The memory can further include a compiler component 322. In some embodiments, the record configuration(s) 210 can be defined by the slice(s) 204, the record schema(s) 206, the scope 215, or a combination thereof. Each of these record configuration(s) 210 can be compiled at compilation 220. The compilation 220 can be configured to compile the record configuration(s) 210, such that the compilation 220 can be utilized as a diagnostic tool. In some examples, the compilation 220 can be performed in two phases, parsing and lowering phases. In the parsing phase, the compilation 220 can concatenate and parse the source (e.g., processed results of the operator-defined inputs) according to its grammar into an abstract syntax tree. For example, the data structure of the record configuration(s) 210 may be simplified by eliminating slice expressions and inlining type expressions, extends relation, and const field definitions. Thus, the representation of the slice(s) 204, record schema(s) 206, and configuration(s) 220 could be simplified. In some embodiments, during or after each compilation stage, various attributes and its associated operator-defined values can be validated. For example, the parsing can validate whether the source is syntactically valid. Following parsing, references in definitions can be validated to ensure they are defined; variables and fields can be checked for uniqueness in dimension, record schemas, and configuration definitions; and the reference relation can be validated to be acyclic. Lowering phase can validate that slice expressions are representable as slices as well as various properties of other slice definitions and dimension definitions that are related to the slices. Following lowering, a set of local checks can be performed on all definitions. Local checks can validate any attributes that depend only on a definition and its direct references. For example, the local checks can include validating whether the type expressions have a consistent representation and whether the scoping slices are consistent between configurations and their record schemas. Following local checks can be global consistency checks, which validate properties of the entire configuration together.

The memory can further include a configuration validation component 324. In some embodiments, the configuration validation component 324 can perform the global consistency checks in two parts: a conflict check and a completeness check. The conflict check can be referred to as a conflict checking. The conflict check can be performed to validate that no two record configuration(s) 210 set a value of the same filed within the context. In some cases, the configuration validation component 324 may generate a conflicting error even if they set the field to the same value. This can ensure the attribute that every configured field value for the active slice(s) has exactly one value, determined by exactly one configuration.

The completeness check can validate that in whichever contexts configurations for a record schema exist, all the fields within the record schema should be defined. In some examples, the completeness check, for each record schema, can be performed based on the below sequence:

computing, for each field, the scope 215 in which that field has values defined;

unioning these scopes and computing the scope by spanning the points in which any of the fields of the record schema have values defined;

computing the scope of the intersection of each field's scope and the record schema's scope, according to the union of their slices intersection product space; and computing the cardinality of each scope, for example by using the inclusion exclusion principal.

In these sequences, the completeness check can validate the configuration 210 when each of these scopes (the record schema, its fields, and the intersections thereof) cover the same set of points. Thus, the completeness check can validate the completeness when those scopes have an equal cardinality.

The memory can also include an indexing component 326. In certain scenarios, this indexing component 326 can be configured to index the configuration and save it as an index within the datastore 118. This specifically pertains to the configuration that has undergone validation during the compilation process, such as through conflict and completeness checks. In some examples, the indexing process involves assigning identifiers to the attributes. These indices then serve to reference the stored values or variables corresponding to each attribute, which can be retrieved upon the operator's request for the configuration.

Figure 4A:
FIG. 4A is an illustrative interaction of configuring the input data analysis configuration based on obtaining and analyzing operator-defined inputs according to one or more embodiments.
Figure 4A:
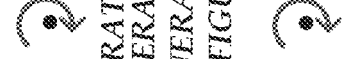
Figure 4B:
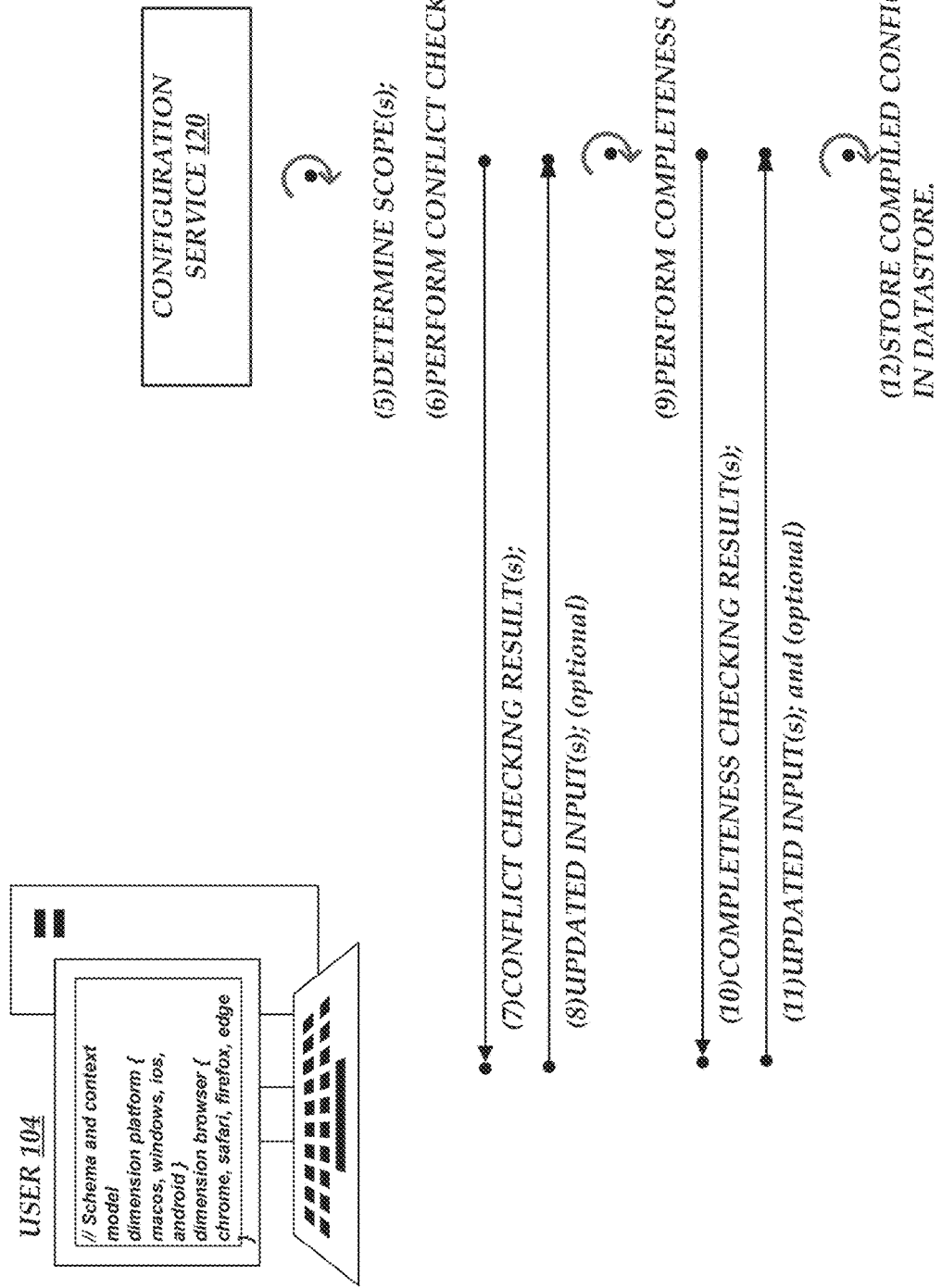
FIG. 4B is an illustrative interaction of compiling the input data analysis configuration(s) based on the generated input data analysis model according to one or more embodiments.

Turning now to FIGS. 4A-4B illustrates interactions of the components of the system 100B, as shown in FIG. 1B, will be described. For purposes of the illustration, it can be assumed that a network provider 110 has been configured in a manner to implement a configuration store 114 and configuration service 120 on behalf of an operator. The present application is not intended to be limited to any particular type of service or the number of individual services that may be accessed or generate processing results as part of an execution of the configuration store 114 on behalf of the operator. Furthermore, the present application is not intended to be limited to the number of network service providers, as depicted in FIG. 1B.

With reference to FIG. 4A, an illustrative interaction of configuring the input data analysis configuration based on obtaining and analyzing operator-defined inputs, will be described. The interaction is illustrative. At (1), the configuration service 120 can receive the operator-defined inputs from the operator computing device 104. In some embodiments, the operator-defined inputs can include operator-defined value or variable for each attribute of the input data analysis configuration. These attributes would be necessary for configuring the input data analysis configuration. In some examples, the attributes can include dimension(s) 202, slice(s) 304, record schema(s) 206, type(s) 208, and record configuration(s) 210. In various embodiments, configuring the input data analysis configuration can involve assigning specific values or variables (e.g., property) to each attribute. In these embodiments, when these values are defined based on operator-specified inputs, they can configure the input data analysis configuration based on operator-defined attributes. In some instances, the attribute identification component 316 can be designed to identify these attributes by accessing a datastore 118. In such embodiments, the attribute identification component 316 can relay the identified attributes to the operator (for example, to the operator's computing device), enabling the operator to specify values for each attribute accordingly.

Further at (1), the operator can define values and/or variables for each attribute. For example, the dimension(s) 202 can be defined as dimensions in the context space. Further, in this example, the context of a input data can have two dimensions, marketplace and collection dimensions, and can be defined as shown below.

dimension marketplace {us, uk, de, fr, it, es, . . . }
dimension collection {aps, automotive, baby, books, hardlines, . . . }

In some examples, the slice(s) 204 can represent a subset of the context space. For example, each slice 204 can constraints the dimension 202 by further defining the dimension 202 with variables. An example of slices that constraint a single dimension can be defined as shown below.

```
// simple slices constrain a single dimension
slice US { marketplace: us }
slice FRITES { marketplace: fr | it | es }
slice APS { collection: aps }
slice Hardlines {collection: automotive | baby |... |
hardlines | ...}
slice Softlines {collection: apparel | softlines | shoes
| clothing | ... }
```

In some cases, the record schema(s) 206 can define a schema for a group of named fields that need to be defined with names or values. For example, the record schema 206 may include a name, scoping slice, and one or more fields with their defined type. In various examples, the record schema(s) 206 can be defined with various keywords, such as "requires," "abstract," "const," etc. An example of record schema 206 with the name, scoping slice, and the fields can be shown below.

fieldset FieldsetName for ScopingSlice {
    field_name1: type_expression1,
    field_name2: type_expression2,
}

In some instances, the type(s) 208 can define configuration values. In some examples, the type(s) 208 can be defined with built-in primitive types, including bools, numeric, and strings. For example, as shown below, the "KNNDstance" can be defined as a float, and the "ModelName" can be defined with strings with the or operator "I."

In various examples, the record configuration(s) 210 can define values for a subset of the fields in the record schema (2) 206. The record configuration(s) 210 can be utilized as declarative valued for the configuration. For example, if the record configuration(s) 210 declares that a filed has a value in a slice, then all contexts in that slice have the value. An example of record configuration(s) 210 with declaring value for the USCategory slice can be shown below.

```
config SemanticMatching for USCategory {
   knn_threshold: 0.6,
   knn_topk: 15,
}
type _KNNDistance = 0.0.. 1.0 // float between 0.0-1.0,
inclusive
type ModelName = "msq_dssm_global_emb_h128" // one of
these exact strings
   | "msq_dssm_global_emb_h256"
   | "dssm_sp_asign_emb_h256"
```

The above operator-defined inputs are merely provided as examples, and these operator-defined inputs can be determined based on specific applications.

At (2), the configuration service 120 can obtain the operator-defined inputs via the network 160 (shown in FIG. 1B). At (3), the configuration service 120 can process the operator-defined inputs to generate input data analysis configuration model (e.g., configuration model 250 shown in FIG. 2B).

In some embodiments, the configuration model 250 can include the attributes, dimension(s) 202, slice(s) 304, record schema(s) 206, type(s) 208, and record configuration(s) 210 (shown in FIG. 2B). Each attribute of the configuration model 250 can process its values or variables (e.g., included in the operator-defined input) by referencing between other attributes of the configuration model 250. For example, the record configuration(s) 210 can define values with reference to the slice(s) 204 and record schema(s) 206. Also, the slice(s) 204 can represent the subset of the dimension(s) 202, and the record schema(s) 206 can define the constraints of the fields defined in the type(s) 208. In addition, the record schema(s) 206 can define scope(s) by utilizing the slice(s) 204. In some examples, the slice(s) 204, the record schema(s) 206, and type(s) 208 can further define the subset of its defined values. For example, slice(s) 204 can serve as a reference to the record schema(s) 206 and configuration(s) 208. In this example, the slice(s) 204 can define the subset of the context space where it is valid for that record schema's fields to be set. In record configuration(s) 210, the slice(s) 204 can define the subset of the context space where that configuration(s) field values are set. These slice(s) 204 can be defined as active slice(s).

In some embodiments, the configuration service 120 can provide a context lookup application programming interface (API). In these embodiments, the lookup API can provide defined record schemas for a context. Thus, the configuration can be generated by assembling the record configuration(s) 210 that corresponds to the context. For example, the sequence of the context lookup API can include:

finding which slices apply to the context;

```
# Step 1
def lookup_slices_by_context(seld: SettingStore, context:
Context) -> set[SliceId]:
    return
    set.intersection(*[slices_by_dimension[dimension]
    [variant]
        for dimension, variant in context.items ( )])
def lookup_configs_by_context (self: SettingStore,
context: Context) -> Set[ConfigId]
``` finding active slice that applies to the context;
Step 2
```
    sliced_ids=selflookup_slices_by_context (context)
    assert(len(self.active_slices.intersection(slice_ids)) !=0)
    fining those slices' configurations; and
    config_ids: Set [ConfigId]=set ( )
    for slice_id in self.lookup_slices_by_context(context):
        config_ids|=self.configs_by_slice[slice_id]
    return config_ids
    assembling together those configurations' record schema.
```

```
def lookup_fieldset_by_context(self: SettingStore,
context: Context, fieldset_id: Fi
    values: Optional[FieldsetValues] = None
    for config_id in
    self.lookup_configs_by_context(context):
        config: Config = self.configs[config_id]
        if self.configs[config_id].fieldset_id !=
        fieldset_id:
            values = values or { }
            values.update(self.config[config_id].values)
    return values
```

In some embodiments, the configuration service 120 can provide the operator to define a scope 215. The scope 215 can generally refer to operator-defined constraints that can be declared independently from record schema(s) 206 and/or slice(s) definitions. Instead, the scope constraints can be defined by the operator and utilized as a means of testing and debugging the record configuration(s) 210. In various examples, the scope 215 can be expressed with a simple infix grammar similar to the slice expression. In some examples, unlike the slice expression, the scope 215 can be expressed by referencing the record schema(s) 206. The scope 215 can be expressed with infix operators, such as |(for union) and &(for intersection), whereas these infix operators are grouped with parenthesis ( ), as shown below example of the scope expression.

//Union of slices A, B, C
A|B|C
(A|B|C)//surrounding parentheses can be used for clarity
//Intersection of slice A with the scopes of fieldsets X and Y
A & @X & @y
//When combining union and intersection, parentheses are required
(A|B|C) & D this is ok
A|B|(C & D) this is okay too
A|B|C & D//SYNTAX ERROR: not permitted
//Intersection of the scopes of fieldsets X and Y
@X & @Y
//Scope where fieldset Z and either of fieldsets X or Y are configured
@Z & (@X|@Y)

In some embodiments, the scope 215 can be expressed in various expressions, including infix with operators, infix with keywords, and predicate functions. For example, with the expression of the infix with operators, the scope 215 can be defined with set inclusion (e.g., <=) and set equality relates (==). With the infix with keywords expression, these set inclusion (e.g., <=) and set equality relates (==) can be replaced with the keywords, requires and is, respectively. With the predicate functions, these set inclusion (e.g., <=) and set equality relates (==) can be replaced with the built-in binary predicates, such as "scope_requireso" and "scope_equalso," respectively. In some embodiments, the scope 215 can be configured as the record configuration 210.

At (4) the configuration service 120 can compile the configuration. In some embodiments, the record configuration(s) 210 can be defined by the slice(s) 204, the record schema(s) 206, the scope 215, or a combination thereof. The detail description of the compilation is described with respect to FIG. 4B.

With reference to FIG. 4B, an illustrative interaction of compiling the input data analysis configuration(s) based on the generated input data analysis configuration model, will be described. The interaction is illustrative. In some embodiments, the record configuration(s) 210 can be defined by the slice(s) 204, the record schema(s) 206, the scope 215, or a combination thereof. Each of these record configuration(s) 210 can be compiled by a compilation 220 of the configuration service 120. The compilation 220 can be configured to compile the record configuration(s) 210, such that the compilation 220 can be utilized as a diagnostic tool. In some examples, the compilation 220 can be performed in two phases, parsing and lowering phases. In the parsing phase, the compilation 220 can concatenate and parse the source (e.g., processed results of the operator-defined inputs) according to its grammar into an abstract syntax tree. For example, the data structure of the record configuration(s) 210 may be simplified by eliminating slice expressions and inlining type expressions, extends relation, and const field definitions. Thus, the representation of the slice(s) 204, record schema(s) 206, and configuration(s) 220 could be simplified. In some embodiments, during or after each compilation stage, various attributes and its associated operator-defined values can be validated. For example, the parsing can validate whether the source is syntactically valid. Following parsing, references in definitions can be validated to ensure they are defined; variables and fields can be checked for uniqueness in dimension, record schemas, and configuration definitions; and the reference relation can be validated to be acyclic. Lowering phase can validate that slice expressions are representable as slices as well as various properties of other slices definitions and dimension definitions that are related to the slices. Following lowering, a set of local checks can be performed on all definitions. Local checks can validate any attributes that depends only on a definition and its direct references. For example, the local checks can include validating: whether the type expressions have a consistent representation; whether the scoping slices are consistent between configurations and their record schemas. Following local checks can be global consistency checks, which validate properties of the entire configuration together.

At (5), the configuration service 120 can determine the scope for each configuration. In some embodiments, the scope can be determined in the previous step, such as step (3) of FIG. 4A. As illustrated in FIG. 4A, the configuration service 120 can provide the operator to define a scope 215. The scope 215 can generally refer to operator-defined constraints that can be declared independently from record schema(s) 206 and/or slice(s) definitions. Instead, the scope constraints can be defined by the operator and utilized as a means of testing and debugging the record configuration(s) 210. In various examples, the scope 215 can be expressed with a simple infix grammar similar to the slice expression. In some examples, unlike the slice expression, the scope 215 can be expressed by referencing the record schema(s) 206. In some examples, the scope 215 can be expressed in various expressions, including infix with operators, infix with keywords, and predicate functions. For example, with the expression of the infix with operators, the scope 215 can be defined with set inclusion (e.g., <=) and set equality relates (==). With the infix with keywords expression, these set inclusion (e.g., <=) and set equality relates (==) can be replaced with the keywords, requires and is, respectively. With the predicate functions, these set inclusion (e.g., <=) and set equality relates (==) can be replaced with the built-in binary predicates, such as "scope_requireso" and "scope_equalso," respectively. In some embodiments, the scope 215 can be configured as the record configuration 210.

At (6), the configuration service 120 can perform a conflict check. The conflict check can be performed to validate that no two record configuration(s) 210 set a value of the same field within the context. The conflict check can be referred to as a conflict checking. In some cases, the configuration validation component 324 may generate a conflicting error even if they set the field to the same value. This can ensure the attribute that every configured field value for the active slice(s) has exactly one value, determined by exactly one configuration.

At (7), the configuration service 120 may transmit any error(s) that occurred as the result of the conflict check. For example, if two slices define a same variables, such as "US market and hardliners," these two slices can be marked an error as a result of the conflict check. In this example, the configuration service 120 can transmit this error to the operator computing device 104 with the identification of the attributes associated with the error. Continuing from the example, the configuration service 120 may identify the two slices that defined the same variables. In some examples, the configuration service 120 can identify the error corresponding to other attributes, such as dimension(s) 202, record schema(s) 206, type(s) 208, and scope 215.

At (8), the operator by utilizing the operator computing device 104 can update the operator-defined input associated with the identified error. This step (8) is optional. In some embodiments, this step (8) may not be performed.

At (9), the configuration service 120 can perform a completeness check. The completeness check can validate that in whichever context configurations for a record schema exist, all the fields within the record schema should be defined. In some examples, the completeness check for each record schema can be performed based on the below sequence:

computing, for each field, the scope 215 in which that field has values defined;

unioning these scopes and computing the scope by spanning the points in which any of the fields of the record schema have values defined;

computing the scope of the intersection of each field's scope and the record schema's scope, according to the union of their slices intersection product space; and computing the cardinality of each scope using the inclusion exclusion principal.

In these sequences, the completeness check can validate the record configuration 210 when each of these scopes (the record schema, its fields, and the intersections thereof) cover the same set of points. Thus, the completeness check can validate the completeness when those scopes have an equal cardinality.

At (10), the configuration service 120 may transmit any error(s) occurred as the results of the completeness check. For example, if one or more slices were undefined, the configuration service 120 may transmit the completeness checking result with identification of the undefined slice(s). In some examples, the configuration service 120 can identify the error corresponding to undefined other attributes, such as dimension(s) 202, record schema(s) 206, type(s) 208, and scope 215.

At (11), the operator by utilizing the operator computing device 104 can update the operator-defined input associated with the identified error. This step (11) is optional. In some embodiments, this step (8) may not be performed.

At (12), the configuration service 120 can store the compiled configuration(s) in the datastore. In certain scenarios, this configuration service 120 can be configured to index the configuration and save it as an index within the datastore 118. This specifically pertains to the configuration that has undergone validation during the compilation process, such as through conflict and completeness checks. In some examples, the indexing process involves assigning identifiers to the attributes. These indices then serve to reference the stored values or variables corresponding to each attribute, which can be retrieved upon the operator's request for the configuration.

Figure 5A:
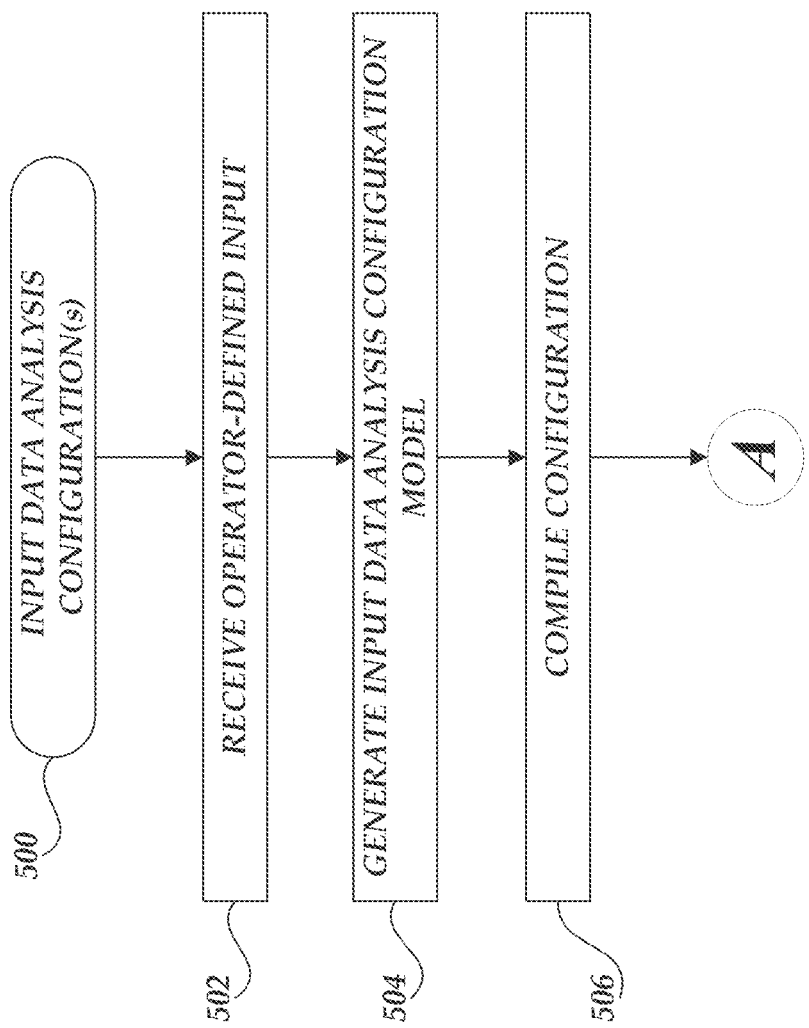
FIG. 5A is a flow diagram illustrative of a routine for configuring the input data analysis(s) based on obtaining and analyzing operator-defined inputs according to one or more embodiments.

Turning now to FIG. 5A, a routine 500 configuring the input data analysis configuration(s) based on obtaining and analyzing operator-defined inputs, will be described. At block 502, the configuration service 120 can receive the operator-defined inputs from the operator computing device 104. In some embodiments, the operator-defined inputs can include operator-defined values or variables for each attribute of the input data analysis configuration. These attributes would be necessary for configuring the input data analysis configuration. In some examples, the attributes can include dimension(s) 202, slice(s) 304, record schema(s) 206, type(s) 208, and record configuration(s) 210. In various embodiments, configuring the input data analysis configuration can involve assigning specific values or variables (e.g., property) to each attribute. In these embodiments, when these values are defined based on operator-specified inputs, they can configure the input data analysis configuration based on operator-defined attributes. In some instances, the attribute identification component 316 can be designed to identify these attributes by accessing a datastore 118. In such embodiments, the attribute identification component 316 can relay the identified attributes to the operator (for example, to the operator's computing device), enabling the operator to specify values for each attribute accordingly.

Further at block 502, the operator can define values and/or variables for each attribute. For example, the dimension(s) 202 can be defined as dimensions in the context space. Further, in this example, the context of a input data can have two dimensions, marketplace and collection dimensions, and can be defined as shown below.

dimension marketplace {us, uk, de, fr, it, es, . . . }
dimension collection {aps, automotive, baby, books, hardlines, . . . }

In some examples, the slice(s) 204 can represent a subset of the context space. For example, each slice 204 can constrain the dimension 202 by further defining the dimension 202 with variables. An example of slices that constrain a single dimension can be defined as shown below.

```
// simple slices constrain a single dimension
slice US { marketplace: us}
slice FRITES { marketplace: fr | it | es }
slice APS { collection: aps }
slice Hardlines { collection: automotive | baby | ... |
hardlines | ...}
slice Softlines { collection: apparel | softlines | shoes
| clothing | ... }
```

In some cases, the record schema(s) 206 can define a schema for a group of named fields that need to be defined with names or values. For example, the record schema 206 may include a name, scoping slice, and one or more fields with their defined type. In various examples, the record schema(s) 206 can be defined with various keywords, such as "requires," "abstract," "const," etc. An example of record schema 206 with the name, scoping slice, and the fields can be shown below.

fieldset FieldsetName for ScopingSlice {
    field_name1: type_expression1,
    field_name2: type_expression2,
}

In some instances, the type(s) 208 can define configuration values. In some examples, the type(s) 208 can be defined with built-in primitive types, including bools, numeric, and strings. For example, as shown below example, the "KNNDstance" can be defined as a float, and the "ModelName" can be defined with strings with the or operator, "|."

```
type KNNDistance = 0.0..1.0   // float between 0.0-1.0,
inclusive
type ModelName = "msq_dssm_global_emb_h128" // one of
these exact strings
   | "msq_dssm_global_emb_h256"
   | "dssm_sp_asin_emb_h256"
```

In various examples, the record configuration(s) 210 can define values for a subset of the fields in the record schema (2) 206. The record configuration(s) 210 can be utilized as declarative valued for the configuration. For example, if the record configuration(s) 210 declares that a filed has a value in a slice, then all contexts in that slice have the value. An example of record configuration(s) 210 with declaring value for the USCategory slice can be shown below.

config SemanticMatching for USCategory {
    knn_threshold: 0.6,
    knn_topk: 15,
}

The above operator-defined inputs are merely provided as examples, and these operator-defined inputs can be determined based on specific applications.

At block 504, the configuration service 120 can process the operator-defined inputs to generate input data analysis configuration model (e.g., configuration model 250 shown in FIG. 2B). In some embodiments, the configuration model 250 can include the attributes, dimension(s) 202, slice(s) 304, record schema(s) 206, type(s) 208, and record configuration(s) 210 (shown in FIG. 2B). Each attribute of the configuration model 250 can process its values or variables (e.g., included in the operator-defined input) by referencing between other attributes of the configuration model 250. For example, the record configuration(s) 210 can define values with reference to the slice(s) 204 and record schema(s) 206. Also, the slice(s) 204 can represent the subset of the dimension(s) 202, and the record schema(s) 206 can define the constraints of the fields defined in the type(s) 208. In addition, the record schema(s) 206 can define scope(s) by utilizing the slice(s) 204. In some examples, the slice(s) 204, the record schema(s) 206, and type(s) 208 can further define the subset of its defined values. For example, slice(s) 204 can serve as a reference to the record schema(s) 206 and configuration(s) 208. In this example, the slice(s) 204 can define the subset of the context space where it is valid for that record schema's fields to be set. In record configuration(s) 210, the slice(s) 204 can define the subset of the context space where that configuration(s) field values are set. These slice(s) 204 can be defined as active slice(s).

In some embodiments, the configuration service 120 can provide a context lookup application programming interface (API). In these embodiments, the lookup API can provide defined record schemas for a context. Thus, the configuration can be generated by assembling the record configuration(s) 210 that corresponds to the context. For example, the sequence of the context lookup API can include:

finding which slices apply to the context;

```
# Step 1
def lookup_slices_by_context(self: SettingStore, context:
Context) -> Set[SliceId]:
   return
   set.intersection(*[slices_by_dimension[dimension]
   [variant]
   for dimension, variant in context.items ( )])
def lookup_configs_by_context(self: SettingStore,
context : Context) -> Set[ConfigId]
``` finding active slice that applies to the context;
Step 2
    slice_ids=self.lookup_slices_by_context (context)
    assert (len(self.active_slices.intersection(slice_ids)) !=0)
    fining those slices' configurations; and
    config_ids: Set[ConfigId]=set ( )
    for slice_id in self.lookup_slices_by_context(context):
        config_ids|=self.configs_by_slice[slice_id]
    return config_ids
    assembling together those configurations' record schema.

```
def lookup_fieldset_by_context(self: SettingStore,
context: Context, fieldset_id: Fi
   values: Optional[FieldsetValues] = None
```

```
for config_id in
    self.lookup_configs_by_context(context):
        config: Config = self.configs[config_id]
        if self.configs[config_id].fieldset_id !=
        fieldset_id:
            values = values or { }
            values.update(self.configs[config_id].values)
return values
```

In some embodiments, the configuration service 120 can provide the operator to define a scope 215. The scope 215 can generally refer to operator-defined constraints that can be declared independently from record schema(s) 206 and/or slice(s) definitions. Instead, the scope constraints can be defined by the operator and utilized as a means of testing and debugging the record configuration(s) 210. In various examples, the scope 215 can be expressed with a simple infix grammar similar to the slice expression. In some examples, unlike the slice expression, the scope 215 can be expressed by referencing the record schema(s) 206. The scope 215 can be expressed with infix operators, such as |(for union) and &(for intersection), whereas these infix operators are grouped with parenthesis ( ), as shown below example of the scope expression.

//Union of slices A, B, C
A|B|C
(A|B|C)//surrounding parentheses can be used for clarity
//Intersection of slice A with the scopes of fieldsets X and Y
A & @X & @y
//When combining union and intersection, parentheses are required
(A|B|C) & D this is ok
A|B|(C & D) this is okay too
A|B|C & D//SYNTAX ERROR: not permitted
//Intersection of the scopes of fieldsets X and Y
@X & @Y
//Scope where fieldset Z and either of fieldsets X or Y are configured
@Z & (@X|@Y)

In some embodiments, the scope 215 can be expressed in various expressions, including infix with operators, infix with keywords, and predicate functions. For example, with the expression of the infix with operators, the scope 215 can be defined with set inclusion (e.g., <=) and set equality relates (==). With the infix with keywords expression, these set inclusion (e.g., <=) and set equality relates (==) can be replaced with the keywords, requires and is, respectively. With the predicate functions, these set inclusion (e.g., <=) and set equality relates (==) can be replaced with the built-in binary predicates, such as "scope_requireso" and "scope_equalso," respectively. In some embodiments, the scope 215 can be configured as the record configuration 210.

At block 506, the configuration service 120 can compile the configuration. In some embodiments, the record configuration(s) 210 can be defined by the slice(s) 204, the record schema(s) 206, the scope 215, or a combination thereof. The detail description of the compilation is described with respect to FIG. 5B.

Figure 5B:
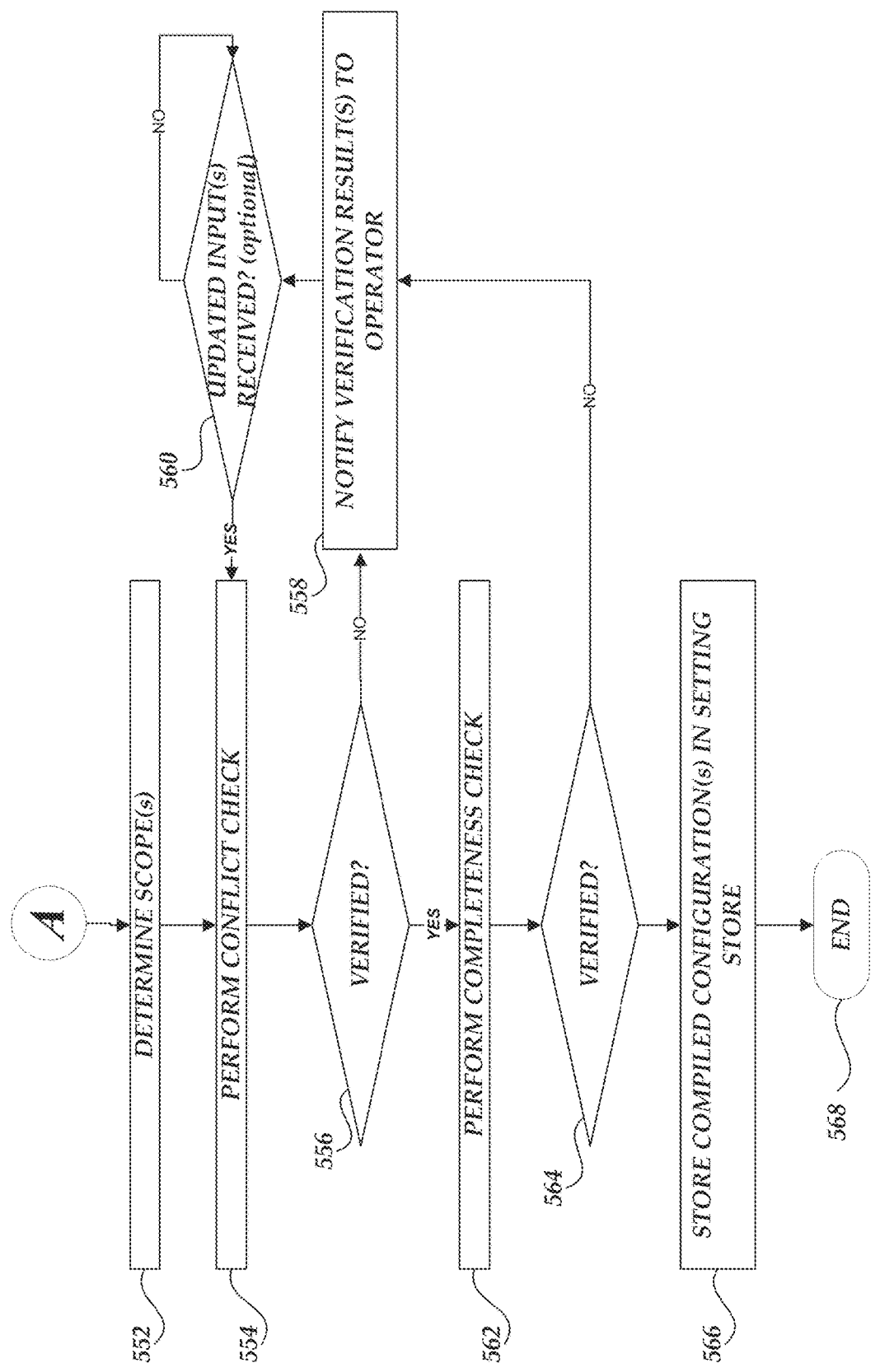
FIG. 5B is a flow diagram illustrative of a routine for compiling the input data analysis(s) according to one or more embodiments.

With reference to FIG. 5B, an illustrative interaction of compiling the input data analysis configuration(s) based on the generated input data analysis configuration model, will be described. The interaction is illustrative. In some embodiments, the record configuration(s) 210 can be defined by the slice(s) 204, the record schema(s) 206, the scope 215, or a combination thereof. Each of these record configuration(s) 210 can be compiled by a compilation 220 of the configuration service 120. The compilation 220 can be configured to compile the record configuration(s) 210, such that the compilation 220 can be utilized as a diagnostic tool. In some examples, the compilation 220 can be performed in two phases, parsing and lowering phases. In the parsing phase, the compilation 220 can concatenate and parse the source (e.g., processed results of the operator-defined inputs) according to its grammar into an abstract syntax tree. For example, the data structure of the record configuration(s) 210 may be simplified by eliminating slice expressions and inlining type expressions, extends relation, and const field definitions. Thus, the representation of the slice(s) 204, record schema(s) 206, and configuration(s) 220 could be simplified. In some embodiments, during or after each compilation stage, various attributes and its associated operator-defined values can be validated. For example, the parsing can validate whether the source is syntactically valid. Following parsing, references in definitions can be validated to ensure they are defined; variables and fields can be checked for uniqueness in dimension, record schemas, and configuration definitions; and the reference relation can be validated to be acyclic. Lowering phase can validate that slice expressions are representable as slices as well as various properties of other slices definitions and dimension definitions that are related to the slices. Following lowering, a set of local checks can be performed on all definitions. Local checks can validate any attributes that depends only on a definition and its direct references. For example, the local checks can include validating: whether the type expressions have a consistent representation; whether the scoping slices are consistent between configurations and their record schemas. Following local checks can be global consistency checks, which validate properties of the entire configuration together.

At block 552, the configuration service 120 can determine the scope for each configuration. In some embodiments, the scope can be determined in the previous step, such as block 504 of FIG. 5A. The configuration service 120 can provide the operator to define a scope 215. The scope 215 can generally refer to operator-defined constraints that can be declared independently from record schema(s) 206 and/or slice(s) definitions. Instead, the scope constraints can be defined by the operator and utilized as a means of testing and debugging the record configuration(s) 210. In various examples, the scope 215 can be expressed with a simple infix grammar similar to the slice expression. In some examples, unlike the slice expression, the scope 215 can be expressed by referencing the record schema(s) 206. In some examples, the scope 215 can be expressed in various expressions, including infix with operators, infix with keywords, and predicate functions. For example, with the expression of the infix with operators, the scope 215 can be defined with set inclusion (e.g., <=) and set equality relates (==). With the infix with keywords expression, these set inclusion (e.g., <=) and set equality relates (==) can be replaced with the keywords, requires and is, respectively. With the predicate functions, these set inclusion (e.g., <=) and set equality relates (==) can be replaced with the built-in binary predicates, such as "scope_requireso" and "scope_equalso," respectively. In some embodiments, the scope 215 can be configured as the record configuration 210.

At block 554, the configuration service 120 can perform a conflict check. The conflict check can be performed to validate that no two record configuration(s) 210 set a value of the same field within the context. The conflict check can be referred to as a conflict checking. In some cases, the configuration validation component 324 may generate a conflicting error even if they set the field to the same value. This can ensure the attribute that every configured field value for the active slice(s) has exactly one value, determined by exactly one configuration.

At decision block 556, the configuration service 120 can determine whether the conflict check validated the configuration(s). If the conflict check validated the configuration (e.g., without occurring run time error(s)), the routine can proceed to block 562. If one or more errors were occurred during the conflict check, the routine may proceed to blocks 558 and 560.

At block 558, the configuration service 120 may transmit any error(s) that occurred as the result of the conflict check. For example, if two slices define a same variables, such as "US market and hardliners," these two slices can be marked an error as a result of the conflict check. In this example, the configuration service 120 can transmit this error to the operator computing device 104 with the identification of the attributes associated with the error. Continuing from the example, the configuration service 120 may identify the two slices that defined the same variables. In some examples, the configuration service 120 can identify the error corresponding to other attributes, such as dimension(s) 202, record schema(s) 206, type(s) 208, and scope 215.

At decision block 560, the configuration service 120 can determine whether the operator by utilizing the operator computing device 104 provided updated operator-defined input associated with the identified error. If the operator did not provide the updated operator-defined input, the decision block 560 can wait until the operator transmits the updated operator-defined input. If the operator provided the updated operator-defined input, the routine can proceed to block 554. This decision block 560 is optional. In some embodiments, this decision block 560 may not be performed.

At block 562, the configuration service 120 can perform a completeness check. The completeness check can validate that in whichever context configurations for a record schema exist, all the fields within the record schema should be defined. In some examples, the completeness check, for each record schema, can be performed based on the below sequence:

computing, for each field, the scope 215 in which that field has values defined;
  unioning these scopes and computing the scope by spanning the points in which any of the fields of the record schema have values defined;
  computing the scope of the intersection of each field's scope and the record schema's scope, according to the union of their slices intersection product space; and
  computing the cardinality of each scope using the inclusion exclusion principal.

In these sequences, the completeness check can validate the record configuration 210 when each of these scopes (the record schema, its fields, and the intersections thereof) cover the same set of points. Thus, the completeness check can validate the completeness when those scopes have an equal cardinality.

At decision block 564, the configuration service 120 can determine whether the completeness check validated the configuration(s). If the completeness check validated the configuration (e.g., without occurring run time error(s)), the routine can proceed to block 566. If one or more errors were occurred during the completeness check, the routine may proceed to blocks 558 and 560.

At block 558, the configuration service 120 may transmit any error(s) that occurred as the result of the completeness check. For example, if one or more slices were undefined, the configuration service 120 may transmit the completeness checking result with identification of the undefined slice(s). In some examples, the configuration service 120 can identify the error corresponding to undefined other attributes, such as dimension(s) 202, record schema(s) 206, type(s) 208, and scope 215.

At decision block 560, the configuration service 120 can determine whether the operator by utilizing the operator computing device 104 provided updated operator-defined input associated with the identified error. If the operator did not provide the updated operator-defined input, the decision block 560 can wait until the operator transmits the updated operator-defined input. If the operator provided the updated operator-defined input, the routine can proceed to block 554. In some embodiments, if the operator provided the updated operator-defined input, the routine can proceed to block 562.

At block 566, the configuration service 120 can store the compiled configuration(s) in the datastore. In certain scenarios, this configuration service 120 can be configured to index the configuration and save it as an index within the datastore 118. This specifically pertains to the configuration that has undergone validation during the compilation process, such as through conflict and completeness checks. In some examples, the indexing process involves assigning identifiers to the attributes. These indices then serve to reference the stored values or variables corresponding to each attribute, which can be retrieved upon the operator's request for the configuration.

The routine 500 can be ended at block 568. Although the operations of the routine 500 are described in a particular order, it should be understood that the routine 500 is not limited as such. Operations of the routine 500 may be performed in an alternative order, serially, or at least partially in parallel. Further, certain operations may be repeated. For example, operations associated with the blocks 554 and 562 may be performed in parallel.

As described above, in various embodiments certain functionality may be accessible by an operator through a web-based viewer (such as a web browser), or other suitable software program). In such implementations, the operator interface may be generated by a server computing system and transmitted to a web browser of the operator (e.g., running on the operator's computing system). Alternatively, data (e.g., operator interface data) necessary for generating the operator interface may be provided by the server computing system to the browser, where the operator interface may be generated (e.g., the operator interface data may be executed by a browser accessing a web service and may be configured to render the operator interfaces based on the operator interface data). The operator may then interact with the operator interface through the web-browser. Operator interfaces of certain implementations may be accessible through one or more dedicated software applications. In certain embodiments, one or more of the computing devices and/or systems of the disclosure may include mobile computing devices, and operator interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without operator-defined input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to an operator.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed:

1. A system for providing input data analysis configurations for network-based services, the system comprising one or more computing processors and memories for executing computer-executable instructions to implement a configuration service, wherein the configuration service is configured to:

obtain a set of configurations, each configuration of the set of configurations defining values for at least two dimensions of a multidimensional space and field values to be applied in use cases matching the values for the at least two dimensions, the field values defining values for a set of fields identified in a schema;

perform a conflict check on the set of configurations at least partly by:

determining that a first and second configuration of the set of configurations overlap in the multidimensional space according to the values for at least two dimensions defined within the respective first and second configurations; and determining that each of the first and second configuration define a field value for a same field of the set of fields; and perform a completeness check on each of the set of configurations at least party by determining that at least one field of the set of fields has an undefined value for at least one point in the multidimensional space according to collective field values among the set of configurations.

2. The system of claim 1, wherein performing the completeness check includes:

computing, for each field of the set of fields, a scope in which the field has values defined;

unioning each scope corresponding each field;

computing scope for the set of fields by spanning points in which any of the field of the set of fields have values defined;

computing an intersection of each field's scope and a scope representing the set of fields, wherein computing the intersection is performed according to union of slices associated with an intersection space; and computing cardinality of each scope.

3. The system of claim 1, wherein the configuration service is further configured to define a plurality of scopes of each of the set of configurations based on additional operator-defined input, wherein the additional operator-defined input defines constraints of one or more fields included in each of the set of configurations.

4. The system of claim 3, wherein each of the plurality of scopes is expressed by infix with operators, infix with keywords, or predicate functions.

5. The system of claim 1, wherein the configuration service is further configured to include a context lookup application programming interface, wherein the context lookup application programming interface includes defined record schemas of a context.

6. The system of claim 5, wherein the configuration service is configured to generate configurations by assembling the defined record schemas of the context lookup application programming interface.

7. A computer-implemented method for providing input data analysis configurations for network-based services, the method comprising:

obtaining a set of configurations, each configuration of the set of configurations defining values for at least two dimensions of a multidimensional space and field values to be applied in use cases matching the values for the at least two dimensions, the field values defining values for a set of fields identified in a schema;

performing a conflict check on the set of configurations at least partly by:
- determining that a first and second configuration of the set of configurations overlap in the multidimensional space according to the values for at least two dimensions defined within the respective first and second configurations; and
- determining that each of the first and second configuration define a field value for a same field of the set of fields; and performing a completeness check on each of the set of configurations at least party by determining that at least one field of the set of fields has an undefined value for at least one point in the multidimensional space according to collective field values among the set of configurations.

8. The computer-implemented method of claim 7, wherein the completeness check includes:
- computing, for each field of the set of fields, a scope in which the field has values defined;
- unioning each scope corresponding each field;
- computing scope for the set of fields by spanning points in which any of the field of the set of fields have values defined;
- computing an intersection of each field's scope and a scope representing the set of fields, wherein computing the intersection is performed according to union of slices associated with an intersection space; and
- computing cardinality of each scope.

9. The computer-implemented method of claim 7, wherein the configuration service is further configured to define a plurality of scopes of each of the set of configurations based on additional operator-defined input, wherein the additional operator-defined input defines constraints of one or more fields included in each of the set of configurations.

10. The computer-implemented method of claim 9, wherein each of the plurality of scopes is expressed by infix with operators, infix with keywords, or predicate functions.

11. The computer-implemented method of claim 10, wherein the infix with the operators are configured to define each scope of the plurality of scopes with a set of expressions comprising "inclusion" and "equality".

12. The computer-implemented method of claim 10, wherein the infix with the keywords are configured to define each scope of the plurality of scopes with a set of keywords comprising "requires" and "is".

13. The computer-implemented method of claim 10, wherein the predicate functions are configured to define each scope of the plurality of scopes with a set of binary predicates comprising "scope_requireso" and "scope_equals( )".

\* \* \* \* \*

UNITED STATES PATENT AND TRADEMARK OFFICE
CERTIFICATE OF CORRECTION

PATENT NO. : 12,461,905 B1
APPLICATION NO. : 18/620878
DATED : November 4, 2025
INVENTOR(S) : Nicholas Matsakis et al.

Page 1 of 2

It is certified that error appears in the above-identified patent and that said Letters Patent is hereby corrected as shown below:

In the Specification

Column 14, Line 63, delete ""scope_equalso,"" and insert -- "scope_equals()," --.

Column 17, Line 21, delete "it, es, }" and insert -- it, es, ... } --.

Column 17, Line 58, delete "operator "I."" and insert -- operator "|." --.

Column 19, Line 43, delete "D this is" and insert -- D // this is --.

Column 19, Line 44, delete "D) this is" and insert -- D) // this is --.

Column 19, Line 61, delete ""scope_requireso"" and insert -- "scope_requires()" --.

Column 19, Line 62, delete ""scope_equalso,"" and insert -- "scope_equals()," --.

Column 22, Line 29 (approx.), delete "operator "I."" and insert -- operator "|." --.

Column 22, Line 47 (approx.), delete "sp_asign_emb" and insert -- sp_assign_emb --.

Column 23, Line 52 (approx.), delete "(self.config[config" and insert -- (self.configs[config --.

Column 24, Line 11, delete "D this is" and insert -- D // this is --.

Column 24, Line 12, delete "D) this is" and insert -- D) // this is --.

Column 24, Line 29, delete ""scope_requireso"" and insert -- "scope_requires()" --.

Signed and Sealed this
Thirteenth Day of January, 2026

John A. Squires
*Director of the United States Patent and Trademark Office*

CERTIFICATE OF CORRECTION (continued)
U.S. Pat. No. 12,461,905 B1

Column 24, Line 30, delete ""scope_equalso,"" and insert -- "scope_equals()," --.

Column 25, Line 38, delete ""scope_requireso"" and insert -- "scope_requires()" --.

Column 25, Line 39, delete ""scope_equalso,"" and insert -- "scope_equals()," --.

Column 29, Line 34, delete "D this is" and insert -- D // this is --.

Column 29, Line 35, delete "D) this is" and insert -- D) // this is --.

Column 29, Line 52, delete ""scope_requireso"" and insert -- "scope_requires()" --.

Column 29, Line 53, delete ""scope_equalso,"" and insert -- "scope_equals()," --.

Column 30, Line 60, delete ""scope_requireso"" and insert -- "scope_requires()" --.

Column 30, Line 60, delete ""scope_equalso,"" and insert -- "scope_equals()," --.

In the Claims

Column 34, Claim 1, Line 29, delete "least party by" and insert -- least partly by --.

Column 35, Claim 7, Line 17, delete "least party by" and insert -- least partly by --.

Column 36, Claim 13, Line 27 (approx.), delete ""scope_requireso"" and insert -- "scope_requires()" --.